(12) United States Patent
Nakamura et al.

(10) Patent No.: US 12,108,007 B2
(45) Date of Patent: Oct. 1, 2024

(54) METHOD FOR CONTROLLING DISPLAY OF SCREEN FOR SETTING METADATA, NON-TRANSITORY STORAGE MEDIUM, AND APPARATUS

(71) Applicant: CANON KABUSHIKI KAISHA, Tokyo (JP)

(72) Inventors: Shun Nakamura, Kanagawa (JP); Takuhiro Okuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/744,279

(22) Filed: May 13, 2022

(65) Prior Publication Data

US 2022/0272226 A1    Aug. 25, 2022

Related U.S. Application Data

(63) Continuation of application No. 17/039,494, filed on Sep. 30, 2020, now Pat. No. 11,363,163.

(30) Foreign Application Priority Data

Oct. 3, 2019   (JP) ................................. 2019-182961

(51) Int. Cl.
*H04N 1/32*    (2006.01)
*H04N 1/00*    (2006.01)

(52) U.S. Cl.
CPC ..... *H04N 1/32128* (2013.01); *H04N 1/00384* (2013.01); *H04N 1/00413* (2013.01); *H04N 2201/0094* (2013.01)

(58) Field of Classification Search
CPC ........... H04N 1/32128; H04N 1/00384; H04N 1/00413; H04N 2201/0094; H04N 1/0035; H04N 1/00395; H04N 1/00411; H04N 1/00437; H04N 1/00127; H04N 1/00122; H04N 1/0036; H04N 1/00244; H04N 1/00358; H04N 1/00389; G06V 10/225; G06V 10/235
See application file for complete search history.

(56) References Cited

U.S. PATENT DOCUMENTS 4,920,499 A  *  4/1990  Skeirik ................... G06N 5/04
                                                    706/11
7,415,471 B1 *  8/2008  Coleman ................ G06Q 40/03
(Continued)

FOREIGN PATENT DOCUMENTS

JP    2010102668 A    5/2010
JP    2017194953 A    10/2017

*Primary Examiner* — Helen Zong
(74) *Attorney, Agent, or Firm* — Canon U.S.A., Inc. IP Division

(57) ABSTRACT

Based on one metadata template determined from among a plurality of metadata templates, a screen including a scan image, a plurality of keys defined in the one determined metadata template, and value input fields each corresponding to a different one of the plurality of keys is displayed, and in a case where a user selects any one of the plurality of keys displayed in the screen, character string areas determined to match a data format of a value corresponding to the key are displayed in such a manner that the character string areas are recognizable as value candidates on the scan image.

18 Claims, 33 Drawing Sheets

(56) References Cited

U.S. PATENT DOCUMENTS

| | | | | |
|---|---|---|---|---|
| 8,162,125 | B1* | 4/2012 | Csulits | G07D 11/50 |
| | | | | 194/207 |
| 8,630,949 | B2* | 1/2014 | McLaughlin | G06Q 20/102 |
| | | | | 705/40 |
| 9,117,118 | B1* | 8/2015 | Lewis | H04N 1/00331 |
| 10,783,366 | B2* | 9/2020 | Suzuki | G06V 30/12 |
| 2005/0134947 | A1* | 6/2005 | Tsue | H04N 1/00167 |
| | | | | 358/1.9 |
| 2005/0289182 | A1* | 12/2005 | Pandian | G06Q 10/10 |
| 2007/0154098 | A1* | 7/2007 | Geva | G06F 40/174 |
| | | | | 715/224 |
| 2012/0009954 | A1* | 1/2012 | Gadiraju | H04W 12/10 |
| | | | | 455/466 |
| 2012/0203676 | A1* | 8/2012 | Chou | G06F 40/117 |
| | | | | 705/30 |
| 2014/0009793 | A1 | 1/2014 | Tomioka | |
| 2014/0258838 | A1* | 9/2014 | Evers | G06F 40/174 |
| | | | | 715/234 |
| 2015/0278593 | A1* | 10/2015 | Panferov | G06V 30/418 |
| | | | | 382/182 |
| 2016/0292262 | A1* | 10/2016 | Matsumoto | G06V 30/224 |
| 2017/0214823 | A1 | 7/2017 | Moorehouse | |
| 2017/0308767 | A1* | 10/2017 | Kodimer | G07G 1/01 |
| 2019/0068551 | A1 | 2/2019 | Bilsten | |
| 2019/0132481 | A1 | 5/2019 | Yasui | |
| 2019/0138804 | A1* | 5/2019 | Suzuki | G06V 10/96 |
| 2019/0244048 | A1* | 8/2019 | Saft | G06V 30/36 |
| 2020/0342221 | A1* | 10/2020 | Sampath | G06N 3/08 |

\* cited by examiner

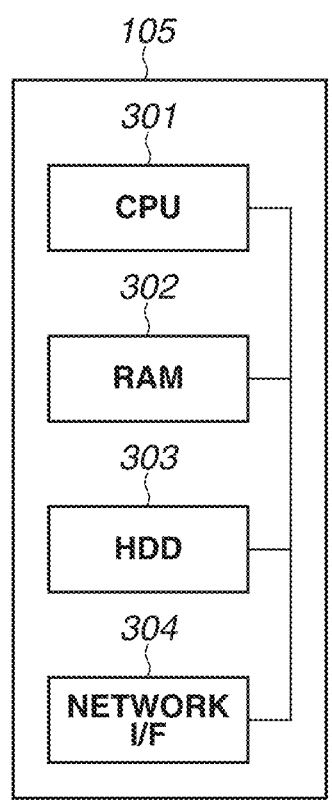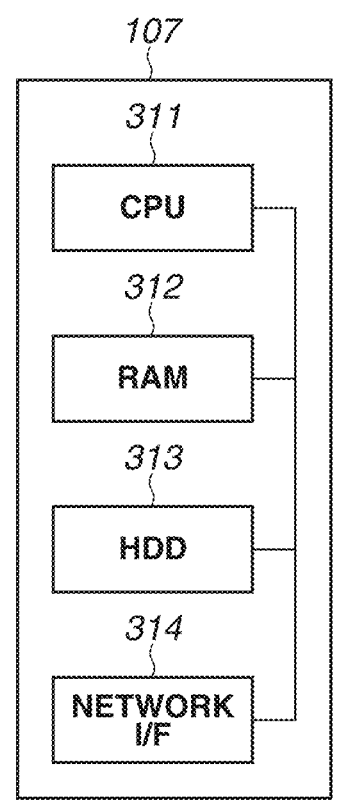

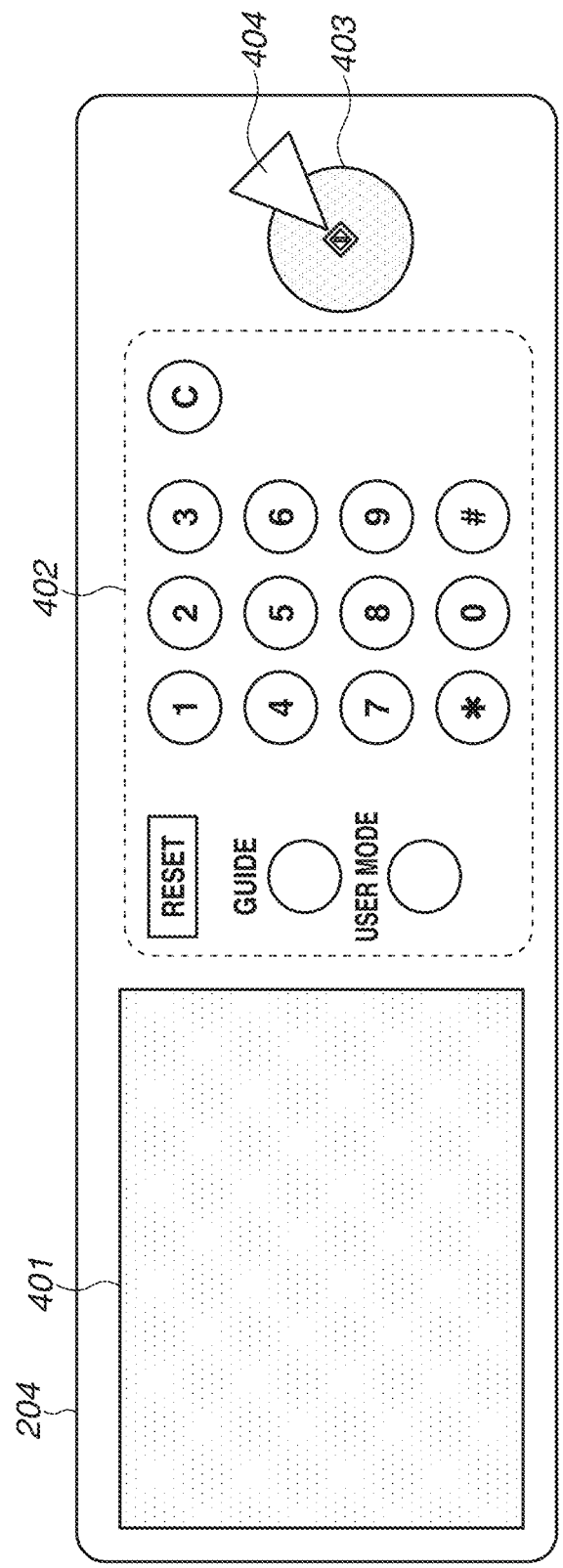

FIG.7

701 · 702 · 703 PAGE 1/2 · 704 (UNSELECTED) · 705 ▶ · 706 NEXT

TEMPLATE

ORDER FORM
NOVEMBER 1, 2015
ORDER NUMBER ABC-123
NISHITORIDE HAKUSAN SHOKAI CO., LTD.
WE PLACE AN ORDER AS FOLLOWS:
DUE DATE: OCTOBER 25, 2015

| No. | NAME OF PRODUCT, ARTICLE, OR MATERIAL | QUANTITY | UNIT PRICE | AMOUNT | REMARKS |
|---|---|---|---|---|---|
| 1 | NAME OF PRODUCT, ARTICLE, OR MATERIAL 1 | 10 | 500 | 5,000 | |
| 2 | NAME OF PRODUCT, ARTICLE, OR MATERIAL 2 | 100 | 11,000 | ##### | |
| 3 | NAME OF PRODUCT, ARTICLE, OR MATERIAL 3 | 200 | 500 | 100,000 | |
| 4 | NAME OF PRODUCT, ARTICLE, OR MATERIAL 4 | 10 | 10,000 | 100,000 | |
| 5 | NAME OF PRODUCT, ARTICLE, OR MATERIAL 5 | 20 | 13,000 | 260,000 | |
| 6 | NAME OF PRODUCT, ARTICLE, OR MATERIAL 6 | 50 | 14,000 | 700,000 | |
| 7 | NAME OF PRODUCT, ARTICLE, OR MATERIAL 7 | 20 | 17,000 | 340,000 | |
| 8 | NAME OF PRODUCT, ARTICLE, OR MATERIAL 8 | 30 | 18,000 | 540,000 | |
| 9 | NAME OF PRODUCT, ARTICLE, OR MATERIAL 9 | 40 | 20,000 | 800,000 | |
| 10 | NAME OF PRODUCT, ARTICLE, OR MATERIAL 10 | 10 | 21,000 | 210,000 | |
| 11 | NAME OF PRODUCT, ARTICLE, OR MATERIAL 11 | 30 | 24,000 | 720,000 | |
| 12 | | | | | |
| 13 | | | | | |
| 14 | | | | | |
| 15 | | | | | |
| TOTAL AMOUNT (INCLUDING CONSUMPTION TAX) | | | | 4,875,000 | |

TORIDE, TORIDE-SHI, IBARAKI-KEN, 111-1111
TORIDE SHOJI CO., LTD.
REPRESENTATIVE DIRECTOR: TARO IBARAKI
PHONE: 111-11-1111  FAX: 111-11-1111

ISSUED CHECKED

FIG.9

PAGE 1/2 — 703

TEMPLATE — 704

(UNDETERMINED) — 705
ACCOUNTING
LEGAL WORKS

901

NEXT — 706

701 — 702

ORDER FORM
NOVEMBER 1, 2015
ORDER NUMBER ABC-123
NISHITORIDE HAKUSAN SHOKAI CO., LTD.
WE PLACE AN ORDER AS FOLLOWS:
DUE DATE: OCTOBER 25, 2015

| No. | NAME OF PRODUCT | QUANTITY | UNIT PRICE | AMOUNT | REMARKS |
|---|---|---|---|---|---|
| 1 | NAME OF PRODUCT, ARTICLE OR MATERIAL 1 | 10 | 500 | 5,000 | |
| 2 | NAME OF PRODUCT, ARTICLE OR MATERIAL 2 | 100 | 11,000 | ##### | |
| 3 | NAME OF PRODUCT, ARTICLE OR MATERIAL 3 | 200 | 500 | 100,000 | |
| 4 | NAME OF PRODUCT, ARTICLE OR MATERIAL 4 | 10 | 10,000 | 100,000 | |
| 5 | NAME OF PRODUCT, ARTICLE OR MATERIAL 5 | 20 | 13,000 | 260,000 | |
| 6 | NAME OF PRODUCT, ARTICLE OR MATERIAL 6 | 50 | 14,000 | 700,000 | |
| 7 | NAME OF PRODUCT, ARTICLE OR MATERIAL 7 | 20 | 17,000 | 340,000 | |
| 8 | NAME OF PRODUCT, ARTICLE OR MATERIAL 8 | 30 | 18,000 | 540,000 | |
| 9 | NAME OF PRODUCT, ARTICLE OR MATERIAL 9 | 40 | 20,000 | 800,000 | |
| 10 | NAME OF PRODUCT, ARTICLE OR MATERIAL 10 | 10 | 21,000 | 210,000 | |
| 11 | NAME OF PRODUCT, ARTICLE OR MATERIAL 11 | 30 | 24,000 | 720,000 | |

TOTAL AMOUNT INCLUDING CONSUMPTION TAX: 4,875,000

ISSUED CHECKED

TORIDE, TORIDE-SHI, IBARAKI-KEN, 111-1111
TORIDE SHOJI CO., LTD.
REPRESENTATIVE DIRECTOR: TARO IBARAKI
PHONE: 1111-11-1111  FAX: 1111-11-1111

FIG.10A

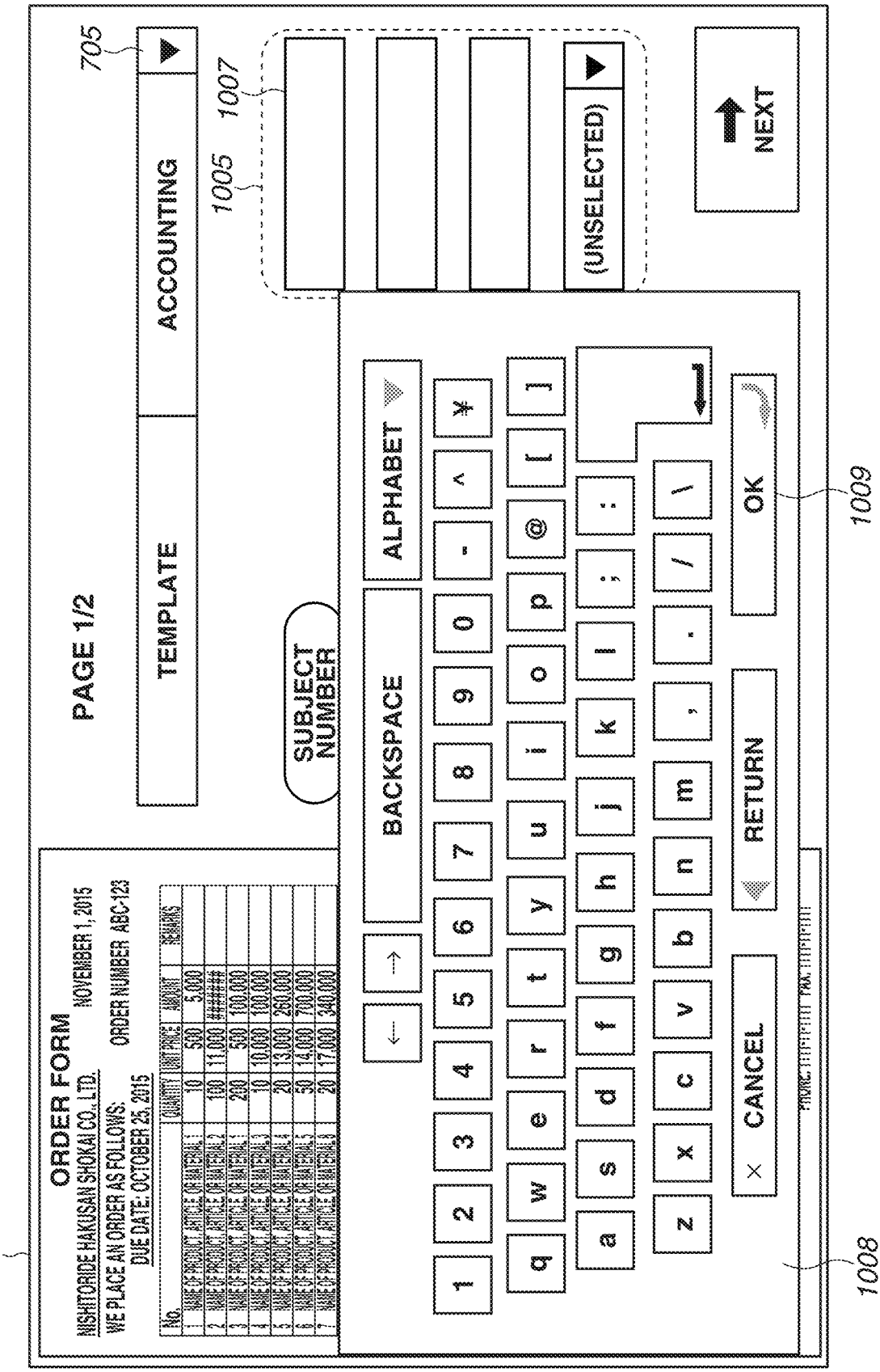

FIG.13A

PAGE 1/2

TEMPLATE     ACCOUNTING

SUBJECT NUMBER

DUE DATE

TOTAL AMOUNT

DOCUMENT TYPE (UNSELECTED)

↑ NEXT

FIG.13B

PAGE 1/2

TEMPLATE    ACCOUNTING

1303 — SUBJECT NUMBER
DUE DATE
TOTAL AMOUNT
DOCUMENT TYPE

1304 — ABC-123
1305 — ABC-123

(UNSELECTED)

↑ NEXT

ORDER FORM

NISHITORIDE HAKUSAN SHOKAI CO., LTD.    NOVEMBER 1, 2015
WE PLACE AN ORDER AS FOLLOWS:    ORDER NUMBER
DUE DATE: OCTOBER 25, 2015

| No. | NAME OF PRODUCT, ARTICLE OR MATERIAL | QUANTITY | UNIT PRICE | AMOUNT | REMARKS |
|---|---|---|---|---|---|
| 1 | NAME OF PRODUCT, ARTICLE OR MATERIAL 1 | 10 | 500 | 5,000 | |
| 2 | NAME OF PRODUCT, ARTICLE OR MATERIAL 2 | 100 | 11,000 | ###### | |
| 3 | NAME OF PRODUCT, ARTICLE OR MATERIAL 3 | 200 | 500 | 100,000 | |
| 4 | NAME OF PRODUCT, ARTICLE OR MATERIAL 4 | 10 | 10,000 | 100,000 | |
| 5 | NAME OF PRODUCT, ARTICLE OR MATERIAL 5 | 20 | 13,000 | 260,000 | |
| 6 | NAME OF PRODUCT, ARTICLE OR MATERIAL 6 | 50 | 14,000 | 700,000 | |
| 7 | NAME OF PRODUCT, ARTICLE OR MATERIAL 7 | 20 | 17,000 | 340,000 | |
| 8 | NAME OF PRODUCT, ARTICLE OR MATERIAL 8 | 30 | 18,000 | 540,000 | |
| 9 | NAME OF PRODUCT, ARTICLE OR MATERIAL 9 | 40 | 20,000 | 800,000 | |
| 10 | NAME OF PRODUCT, ARTICLE OR MATERIAL 10 | 10 | 21,000 | 210,000 | |
| 11 | NAME OF PRODUCT, ARTICLE OR MATERIAL 11 | 30 | 24,000 | 720,000 | |

TOTAL AMOUNT INCLUDING CONSUMPTION TAX    4,875,000

ISSUED CHECKED

TORIDE, TORIDE-SHI, IBARAKI-KEN, 111-1111
TORIDE SHOJI CO., LTD.
REPRESENTATIVE DIRECTOR: TARO IBARAKI
PHONE: 1111-11-1111    FAX: 1111-11-1111

FIG.14A

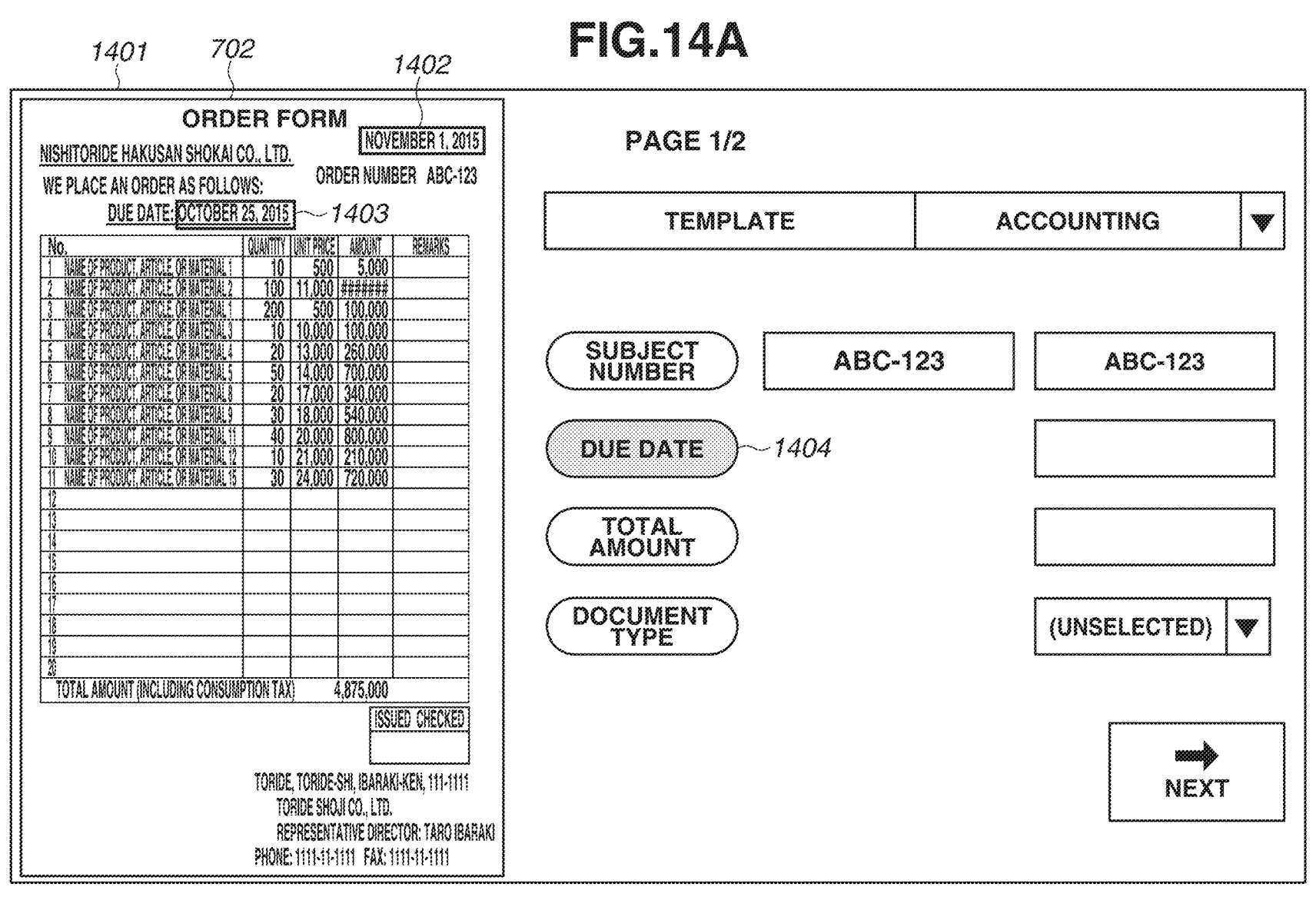

PAGE 1/2

TEMPLATE | ACCOUNTING ▼

ABC-123 | ABC-123

SUBJECT NUMBER

DUE DATE — 1404

TOTAL AMOUNT

DOCUMENT TYPE (UNSELECTED) ▼

↑ NEXT

---

ORDER FORM — NOVEMBER 1, 2015 — 1402

NISHITORIDE HAKUSAN SHOKAI CO., LTD.  ORDER NUMBER: ABC-123

WE PLACE AN ORDER AS FOLLOWS:

DUE DATE: OCTOBER 25, 2015 — 1403

| No. | NAME OF PRODUCT, ARTICLE, OR MATERIAL | QUANTITY | UNIT PRICE | AMOUNT | REMARKS |
|---|---|---|---|---|---|
| 1 | NAME OF PRODUCT, ARTICLE, OR MATERIAL 1 | 10 | 500 | 5,000 | |
| 2 | NAME OF PRODUCT, ARTICLE, OR MATERIAL 2 | 100 | 11,000 | ###### | |
| 3 | NAME OF PRODUCT, ARTICLE, OR MATERIAL 3 | 200 | 500 | 100,000 | |
| 4 | NAME OF PRODUCT, ARTICLE, OR MATERIAL 4 | 10 | 10,000 | 100,000 | |
| 5 | NAME OF PRODUCT, ARTICLE, OR MATERIAL 5 | 20 | 13,000 | 260,000 | |
| 6 | NAME OF PRODUCT, ARTICLE, OR MATERIAL 6 | 50 | 14,000 | 700,000 | |
| 7 | NAME OF PRODUCT, ARTICLE, OR MATERIAL 7 | 20 | 17,000 | 340,000 | |
| 8 | NAME OF PRODUCT, ARTICLE, OR MATERIAL 8 | 30 | 18,000 | 540,000 | |
| 9 | NAME OF PRODUCT, ARTICLE, OR MATERIAL 9 | 40 | 20,000 | 800,000 | |
| 10 | NAME OF PRODUCT, ARTICLE, OR MATERIAL 10 | 10 | 21,000 | 210,000 | |
| 11 | NAME OF PRODUCT, ARTICLE, OR MATERIAL 11 | 30 | 24,000 | 720,000 | |

TOTAL AMOUNT (INCLUDING CONSUMPTION TAX): 4,875,000

ISSUED | CHECKED

TORIDE, TORIDE-SHI, IBARAKI-KEN, 111-1111
TORIDE SHOJI CO., LTD.
REPRESENTATIVE DIRECTOR: TARO IBARAKI
PHONE: 1111-11-1111   FAX: 1111-11-1111

Figure 14B:
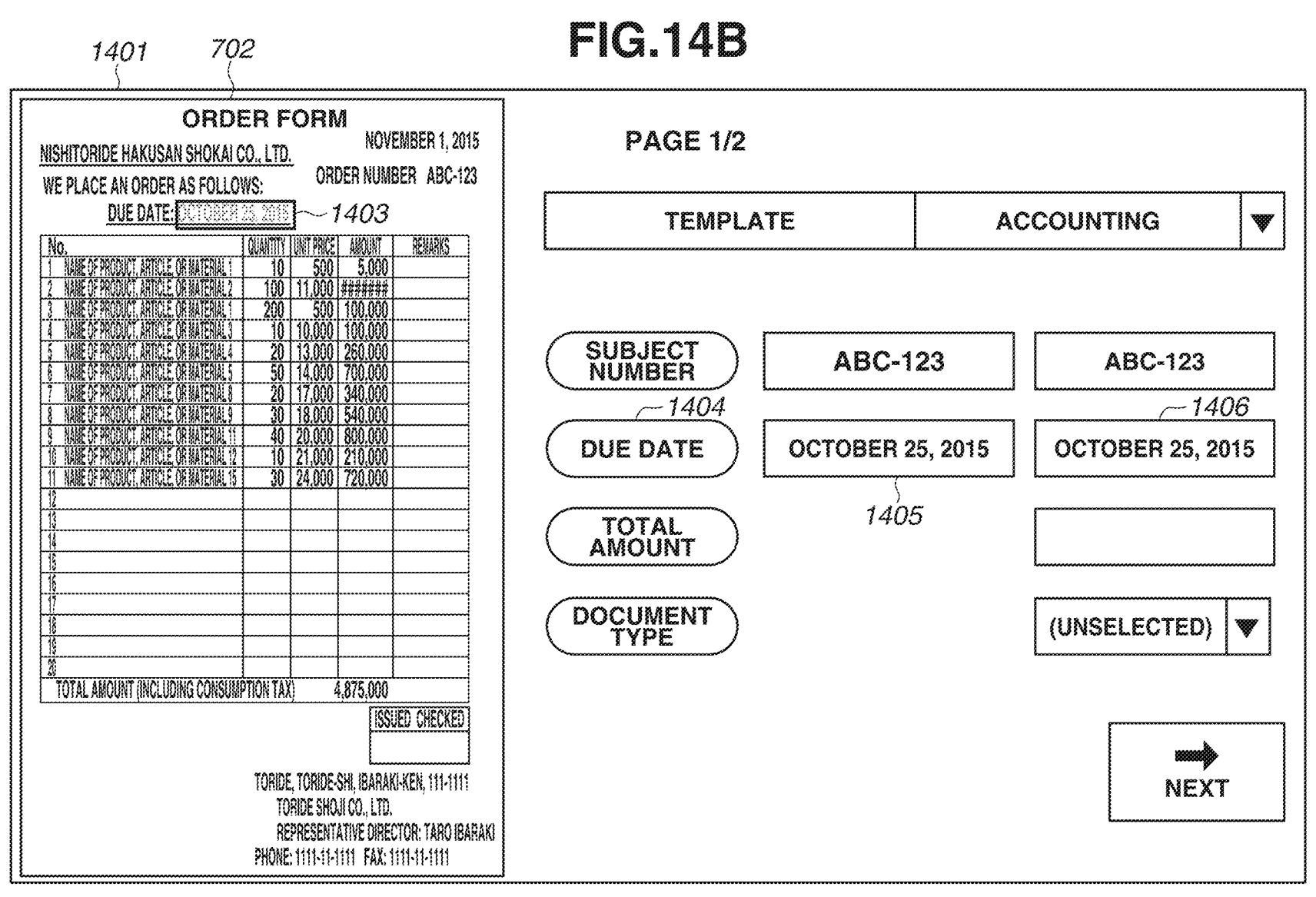

PAGE 1/2

| TEMPLATE | ACCOUNTING |

SUBJECT NUMBER: ABC-123 | ABC-123
DUE DATE: OCTOBER 25, 2015 | OCTOBER 25, 2015
TOTAL AMOUNT: 
DOCUMENT TYPE: (UNSELECTED)

NEXT →

Figure 15B:
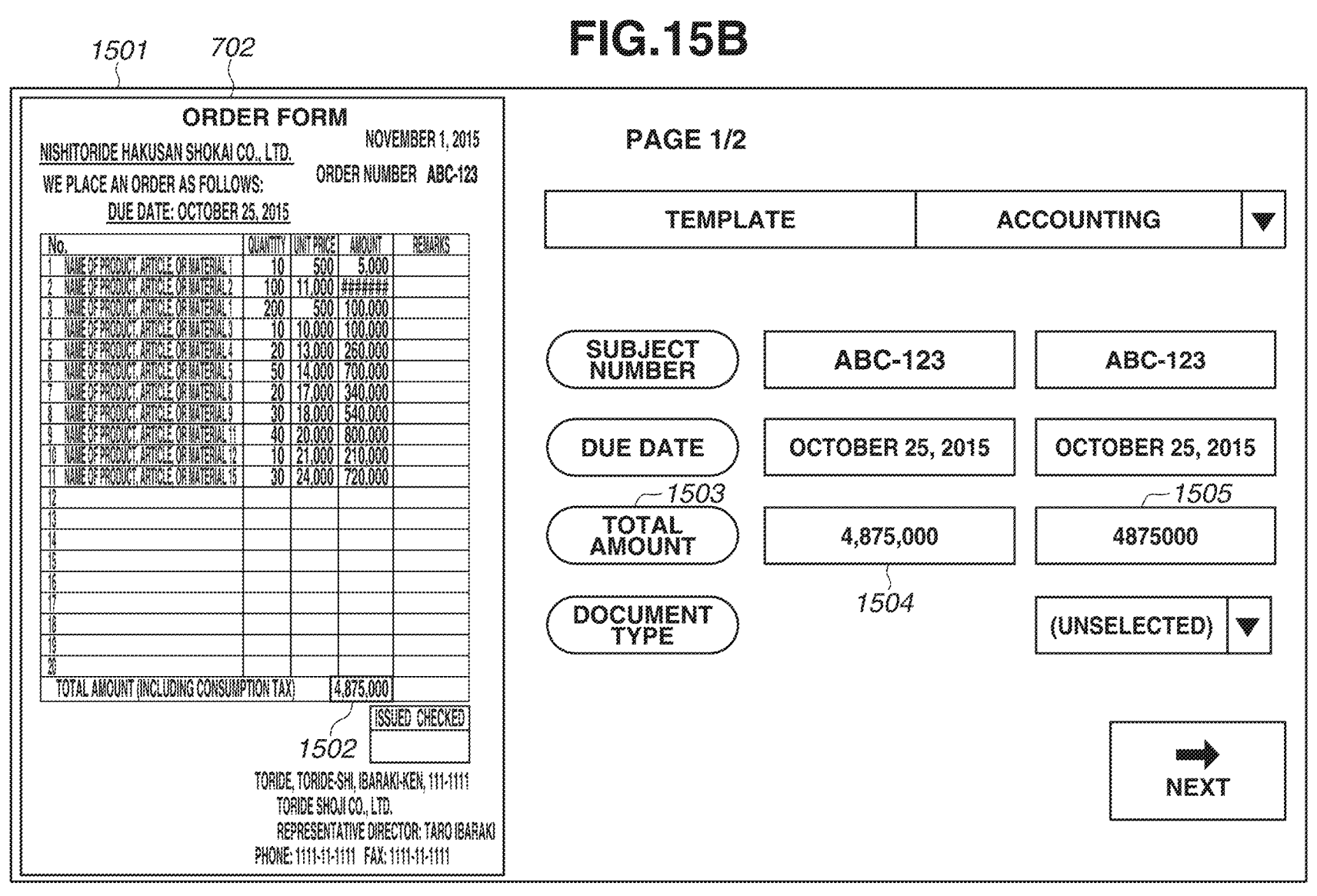

PAGE 1/2

| TEMPLATE | ACCOUNTING |
|---|---|

SUBJECT NUMBER: ABC-123 | ABC-123

DUE DATE: OCTOBER 25, 2015 | OCTOBER 25, 2015 — 1505

TOTAL AMOUNT: 4,875,000 — 1504 | 4875000

DOCUMENT TYPE: (UNSELECTED)

↑ NEXT

1503

ORDER FORM  NOVEMBER 1, 2015
1501  702
NISHITORIDE HAKUSAN SHOKAI CO., LTD.
ORDER NUMBER ABC-123
WE PLACE AN ORDER AS FOLLOWS:
DUE DATE: OCTOBER 25, 2015

1502  4,875,000  ISSUED CHECKED

TORIDE, TORIDE-SHI, IBARAKI-KEN, 111-1111
TORIDE SHOJI CO., LTD.
REPRESENTATIVE DIRECTOR: TARO IBARAKI
PHONE: 111-11-1111   FAX: 111-11-1111

FIG.16A

PAGE 1/2

| TEMPLATE | ACCOUNTING ▼ |

- SUBJECT NUMBER: ABC-123 | ABC-123
- DUE DATE: OCTOBER 25, 2015 | OCTOBER 25, 2015
- TOTAL AMOUNT: 4,875,000 | 4875000
- DOCUMENT TYPE: *1602*

*1603* (UNSELECTED) ▼
ESTIMATE FORM
INVOICE
*1604* ORDER FORM

*1601* *702*

ORDER FORM  NOVEMBER 1, 2015
NISHITORIDE HAKUSAN SHOKAI CO., LTD.  ORDER NUMBER 123456
WE PLACE AN ORDER AS FOLLOWS:
DUE DATE: OCTOBER 25, 2015

| No. | | QUANTITY | UNIT PRICE | AMOUNT | REMARKS |
|---|---|---|---|---|---|
| 1 | NAME OF PRODUCT, ARTICLE OR MATERIAL 1 | 10 | 500 | 5,000 | |
| 2 | NAME OF PRODUCT, ARTICLE OR MATERIAL 2 | 100 | 11,000 | ###### | |
| 3 | NAME OF PRODUCT, ARTICLE OR MATERIAL 3 | 200 | 500 | 100,000 | |
| 4 | NAME OF PRODUCT, ARTICLE OR MATERIAL 4 | 10 | 10,000 | 100,000 | |
| 5 | NAME OF PRODUCT, ARTICLE OR MATERIAL 5 | 20 | 13,000 | 260,000 | |
| 6 | NAME OF PRODUCT, ARTICLE OR MATERIAL 6 | 50 | 14,000 | 700,000 | |
| 7 | NAME OF PRODUCT, ARTICLE OR MATERIAL 7 | 20 | 17,000 | 340,000 | |
| 8 | NAME OF PRODUCT, ARTICLE OR MATERIAL 8 | 30 | 18,000 | 540,000 | |
| 9 | NAME OF PRODUCT, ARTICLE OR MATERIAL 9 | 40 | 20,000 | 800,000 | |
| 10 | NAME OF PRODUCT, ARTICLE OR MATERIAL 10 | 10 | 21,000 | 210,000 | |
| 11 | NAME OF PRODUCT, ARTICLE OR MATERIAL 11 | 30 | 24,000 | 720,000 | |

TOTAL AMOUNT (INCLUDING CONSUMPTION TAX): 4,875,000

ISSUED CHECKED

TORIDE, TORIDE-SHI, IBARAKI-KEN, 111-1111
TORIDE SHOJI CO., LTD.
REPRESENTATIVE DIRECTOR: TARO IBARAKI
PHONE: 1111-11-1111  FAX: 1111-11-1111

FIG.16B

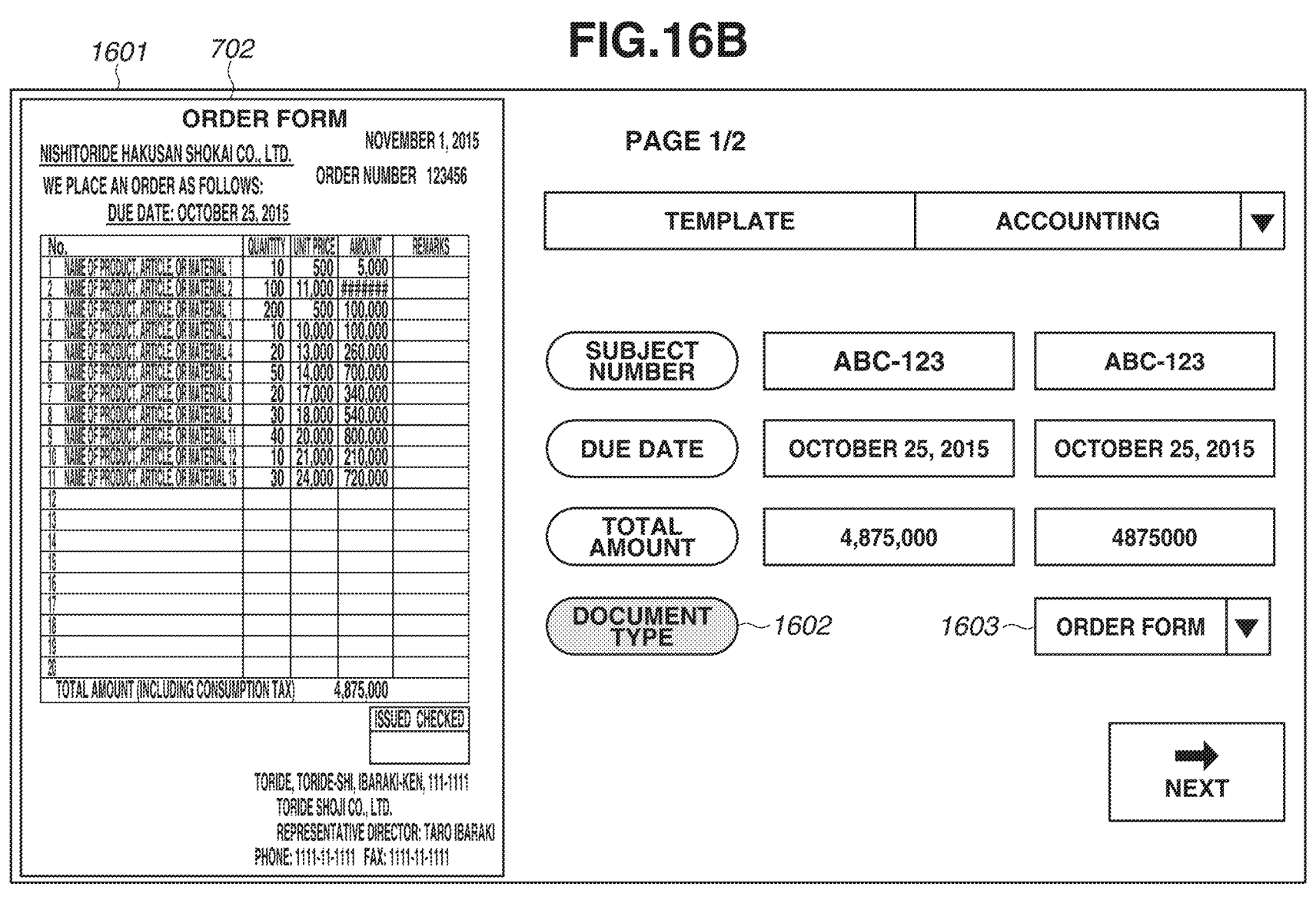

PAGE 1/2

| TEMPLATE | ACCOUNTING |
|---|---|

SUBJECT NUMBER: ABC-123 | ABC-123
DUE DATE: OCTOBER 25, 2015 | OCTOBER 25, 2015
TOTAL AMOUNT: 4,875,000 | 4875000
DOCUMENT TYPE — 1602 | ORDER FORM — 1603

NEXT

ORDER FORM — NOVEMBER 1, 2015
NISHITORIDE HAKUSAN SHOKAI CO., LTD.   ORDER NUMBER 123456
WE PLACE AN ORDER AS FOLLOWS:
DUE DATE: OCTOBER 25, 2015

PAGE 2/2

TEMPLATE | LEGAL WORKS

SUBJECT NUMBER ~1702
CLIENT
DATE

↑ SEND TO SERVER

↓ RETURN

1801

POWER OF ATTORNEY

PROXY: ADDRESS: ○○-○○, ○○-MACHI ○○-CHOME, YOKOHAMA-SHI, KANAGAWA-KEN
NAME: TARO KANAGAWA —702

I DESIGNATE THE ABOVE-MENTIONED PERSON AS A PROXY, AND ENTRUST THE PROXY WITH THE FOLLOWING ISSUES:

* ISSUES RELATED TO REGISTRATION OF TRANSFER
TRANSFER SUBJECT NUMBER: 12345678 ~1802

DECEMBER 11, 2015

MANDATOR ADDRESS: xx-xx, xx-MACHI xx-CHOME, BUNKYO-KU, TOKYO
NAME: HANAKO TOKYO

FIG.18B

PAGE 2/2

POWER OF ATTORNEY

PROXY: ADDRESS: ○○-○○, ○○-MACHI, ○○-CHOME, YOKOHAMA-SHI, KANAGAWA-KEN
NAME: TARO KANAGAWA

I DESIGNATE THE ABOVE-MENTIONED PERSON AS A PROXY, AND ENTRUST THE PROXY WITH THE FOLLOWING ISSUES:

* ISSUES RELATED TO REGISTRATION OF TRANSFER TRANSFER SUBJECT NUMBER:12349876 ~1802

DECEMBER 11, 2015

MANDATOR ADDRESS: xx-xx, xx-MACHI, xx-CHOME, BUNKYO-KU, TOKYO
NAME: HANAKO TOKYO 1801
702

| TEMPLATE | LEGAL WORKS |
|---|---|
| 1702 | |
| 12349876 (1803) | 12349876 (1804) |

SUBJECT NUMBER

CLIENT

DATE

↓ RETURN

↑ SEND TO SERVER

FIG.20

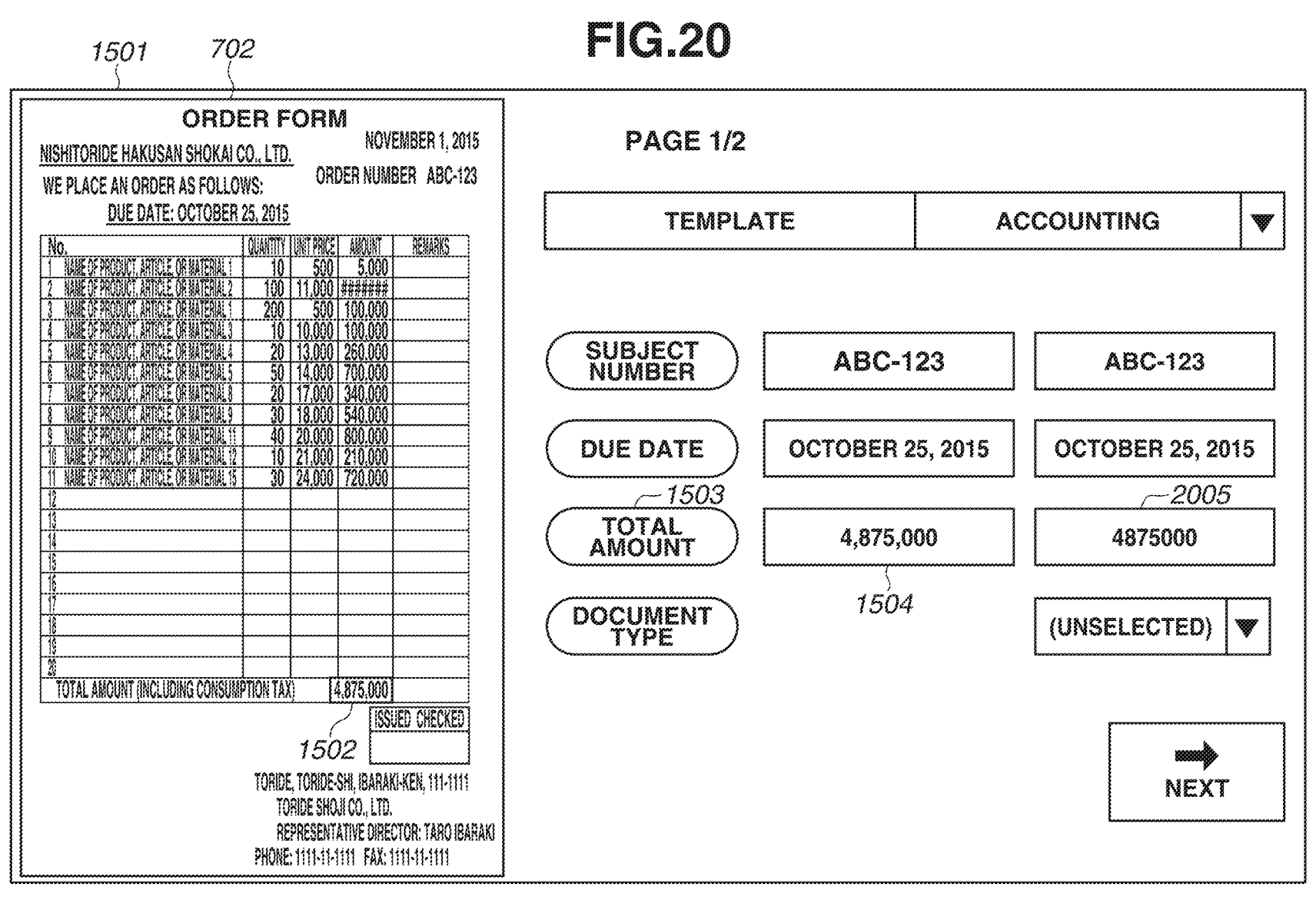

PAGE 1/2

| TEMPLATE | ACCOUNTING ▼ |
|---|---|

SUBJECT NUMBER: ABC-123 | ABC-123
DUE DATE: OCTOBER 25, 2015 | OCTOBER 25, 2015 — 2005
TOTAL AMOUNT: 4,875,000 — 1504 | 4875000
DOCUMENT TYPE: (UNSELECTED) ▼

↑ NEXT

METHOD FOR CONTROLLING DISPLAY OF SCREEN FOR SETTING METADATA, NON-TRANSITORY STORAGE MEDIUM, AND APPARATUS

CROSS-REFERENCE TO RELATED APPLICATION

This application is a Continuation of U.S. application Ser. No. 17/039,494, filed Sep. 30, 2020, which claims priority from Japanese Patent Application No. 2019-182961, filed Oct. 3, 2019, which are hereby incorporated by reference herein in their entireties.

BACKGROUND

Field

The present disclosure relates to a technique for setting metadata to image data obtained by scanning using character information extracted from the image data.

Description of the Related Art

Conventionally, there has been a technique for extracting character strings in digital data from a document by performing Optical Character Recognition (OCR) processing on image data acquired by scanning the document. There also has been a technique for recognizing a structure of image data by dividing image data into area blocks for each element, such as character strings and background in the image data.

Meanwhile, an image processing apparatus can attach additional information (metadata) to be used by a subsequent system to image data acquired by scanning before transmitting the image data to the subsequent system. What type of metadata to be attached is depended on a system receiving the image data. For example, when scanning a form, e.g., a receipt and transmitting the form to an accounting system, the image processing apparatus can perform character recognition processing on information, e.g., an amount of money, to be used for accounting processing to acquire metadata, attach the metadata to image data of the form, and then transmit the form image data.

Japanese Patent Application Laid-Open No. 2017-194953 discloses a technique for determining a position of price data on a receipt image, highlighting a user selectable position on a preview image, and prompting the user to select the position.

According to the technique disclosed in Japanese Patent Application Laid-Open No. 2017-194953, the user can easily select price data to be attached as metadata to image data of a form from among character string blocks included in the image data.

However, the technique disclosed in Japanese Patent Application Laid-Open No. 2017-194953 does not enable the user to easily select data other than price data on the image data and set the price data as metadata.

SUMMARY

According to an aspect of the embodiments, a method for controlling display of a screen for setting metadata to a scan image includes displaying, based on one metadata template determined from among a plurality of metadata templates defining a plurality of keys to be used as metadata and data formats of values corresponding to respective keys, the screen including the scan image, a plurality of keys defined in the one determined metadata template and value input fields each corresponding to a different one of the plurality of keys, displaying, in a case where a user selects any one of the plurality of keys displayed in the screen, character string areas determined to match a data format in such a manner that the character string areas are recognizable as candidates on the scan image in the screen, the determination being performed based on the data format of the value corresponding to the selected key defined in the one determined metadata template; and setting, in a case where the user selects any one of the character string areas displayed recognizable as candidates, a character recognition result for the selected character string area in a value input field corresponding to the selected key in the screen.

Further features of the disclosure will become apparent from the following description of exemplary embodiments with reference to the attached drawings.

BRIEF DESCRIPTION OF THE DRAWINGS

FIGS. 3A and 3B are diagrams each illustrating an example configuration of a server configuring the image processing system.

FIG. 4 is a diagram illustrating an example configuration of an operation unit of the image forming apparatus.

FIG. 7 is a diagram illustrating an example of a screen displayed on the operation unit of the image forming apparatus.

FIG. 9 is a diagram illustrating an example of a screen displayed on the operation unit of the image forming apparatus.

FIGS. 10A and 10B are diagram illustrating examples of screens displayed on the operation unit of the image forming apparatus.

FIGS. 13A and 13B are diagrams illustrating examples of screens displayed on the operation unit of the image forming apparatus.

FIGS. 14A and 14B are diagrams illustrating examples of screens displayed on the operation unit of the image forming apparatus.

FIGS. 15A and 15B are diagrams illustrating examples of screens displayed on the operation unit of the image forming apparatus.

FIGS. 16A and 16B are diagrams illustrating examples of screens displayed on the operation unit of the image forming apparatus.

FIGS. 18A and 18B are diagrams illustrating examples of screens displayed on the operation unit of the image forming apparatus.

FIG. 20 is a diagram illustrating an example of a screen displayed on the operation unit of the image forming apparatus.

FIGS. 26A and 26B are diagrams illustrating examples of screens displayed on the operation unit of the image forming apparatus.

DESCRIPTION OF THE EMBODIMENTS

Figure 1:
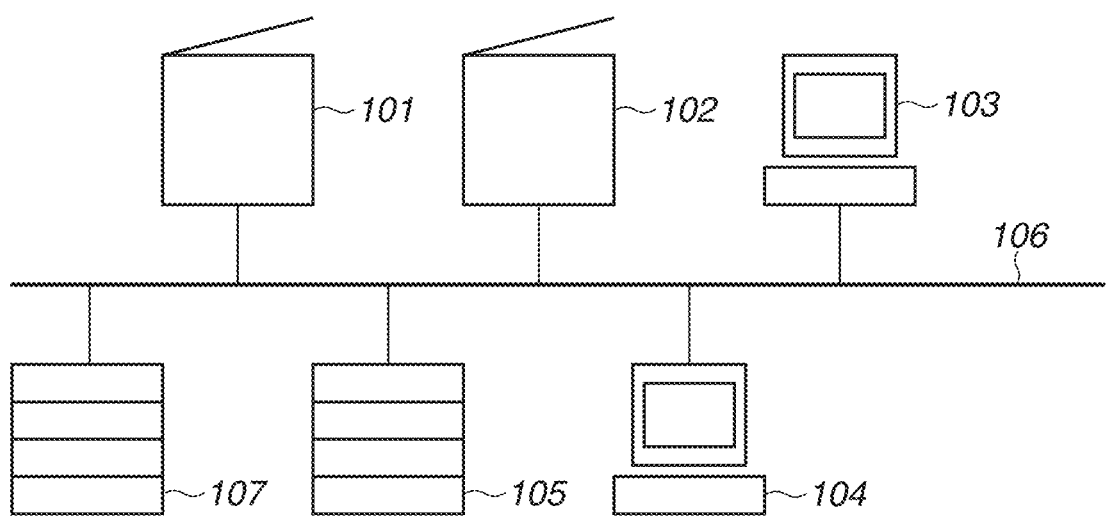
FIG. 1 is a diagram illustrating an example configuration of an image processing system.

FIG. 1 is a diagram illustrating an example configuration of an image forming system. The imaging forming system includes image forming apparatuses 101 and 102, information processing terminals 103 and 104, an image processing server 105, and a storage server 107 which are connected with each other via a network 106 to communicate with each other.

While FIG. 1 illustrates a case where the image forming system includes two image forming apparatuses, namely, the image forming apparatuses 101 and 102, the number of image forming apparatuses is not limited thereto but any number (one or more). A configuration of the image forming apparatus 101 will be described below, representing the image forming apparatuses 101 and 102, and redundant descriptions about the image forming apparatus 102 will be omitted. The network 106 may be a network of any kind, such as a local area network (LAN) and the Internet, that enables apparatuses in the image forming system to communicate with each other.

The image forming apparatus 101 is capable of receiving an image data printing request (print data) from the information processing terminals 103 and 104, printing the print data, reading image data by the scanner on the image forming apparatus 101, and printing the image data read by the scanner. The image forming apparatus 101 is also capable of storing the print data received from the information processing terminals 103 and 104 and transmitting the image read by the scanner of the image forming apparatus 101 to the information processing terminals 103 and 104. The image forming apparatus 101 is further capable of transmitting the image data to the image processing server 105 to request for image processing, and printing a document stored in the storage server 107. The image forming apparatus 101 is also capable of implementing functions of a known image forming apparatus such as a Multifunction Peripheral (MFP).

The image processing server 105 is capable of performing image processing requested by the image forming apparatus 101, transmitting image data generated by the image processing, and requesting the storage server 107 to store the image data. While FIG. 1 illustrates a case where the image forming system includes one each of two servers, namely, the image processing server 105 and the one storage server 107, the number of image processing servers 105 and the number of storage servers 107 are not limited thereto but any numbers (one or more). The two servers may have different roles according to applications. In the present configuration, the image processing server 105 and the storage server 107 may be disposed on a cloud, i.e., the Internet.

Figure 2:
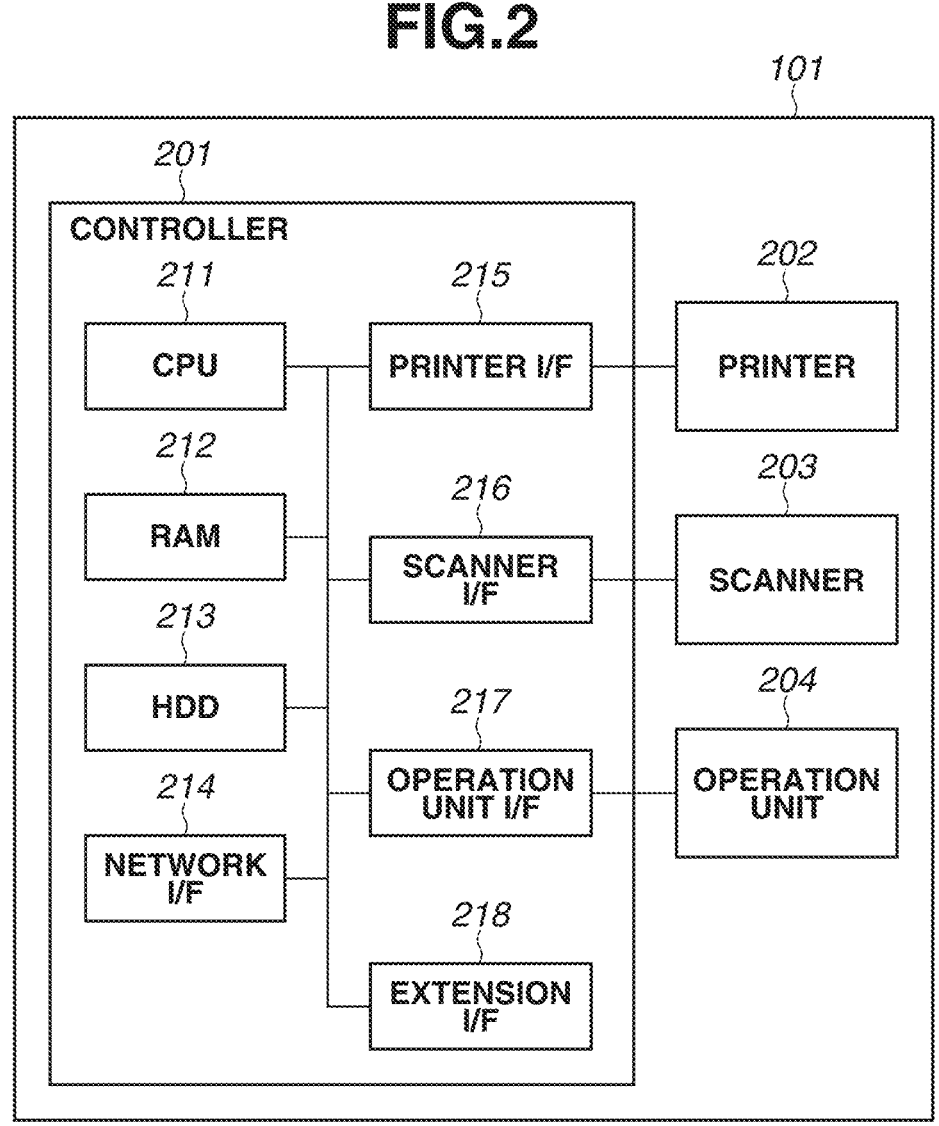
FIG. 2 is a diagram illustrating an example configuration of an image forming apparatus.

FIG. 2 is a diagram illustrating an example of a hardware configuration of the image forming apparatus 101. The image forming apparatus 101 includes a controller 201, a printer 202, a scanner 203, and an operation unit 204. The controller 201 includes a central processing unit (CPU) 211, a random access memory (RAM) 212, a hard disk drive (HDD) 213, a network interface (I/F) 214, a printer I/F 215, a scanner I/F 216, an operation unit I/F 217, and an expansion I/F 218. The CPU 211 can transfer and receive data to/from the RAM 212, the HDD 213, the network I/F 214, the printer I/F 215, the scanner I/F 216, the operation unit I/F 217, and the expansion I/F 218. The CPU 211 also loads instructions (program) read from the HDD 213 into the RAM 212 and executes the instructions loaded in the RAM 212.

The HDD 213 can store instructions (program) that can be executed by the CPU 211, setting values that is used by the image forming apparatus 101, data related to processing requested by the user. The RAM 212 is an area for temporarily storing instructions read from the HDD 213 by the CPU 211. The RAM 212 can also store various types of data to be used for execution of instructions. For example, the CPU 211 can perform the image processing by loading input data into the RAM 212.

The network I/F 214 is an interface for performing network communication with an apparatus in the image forming system. The network I/F 214 can inform the CPU 211 of data reception and transmit the data loaded on the RAM 212 to the network 106. The printer I/F 215 can transmit print data received from the CPU 211 to the printer 202 and transmit a printer status received from the printer 202 to the CPU 211. The scanner I/F 216 can transmit an image read instruction transmitted from the CPU 211 to the scanner 203, transmit image data received from the scanner 203 to the CPU 211, and transmit a scanner status received from the scanner 203 to the CPU 211. The operation unit I/F 217 can transmit a user instruction input from the operation unit 204 to the CPU 211, and transmit information about a screen to be operated by the user to the operation unit 204. The expansion I/F 218 is an interface for connecting an external device to the image forming apparatus 101. The expansion I/F 218 has, for example, a Universal Serial Bus (USB) format interface. When an external storage device such as a USB memory is connected to the expansion I/F 218, the image forming apparatus 101 can read data stored in the external storage device and write data to the external storage device.

The printer 202 can print image data received from the printer I/F 215 on paper and transmit a status of the printer 202 to the printer I/F 215. The scanner 203 can read information printed on paper placed on the document positioning plate or an automatic document feeder (ADF) according to an image read instruction received from the scanner I/F 216, digitize the information, and transmit the information to the scanner I/F 216. The scanner 203 can transmit the state of the document positioning plate to the scanner I/F 216. The operation unit 204 is an interface for enabling the user to issue various instructions to the image forming apparatus 101. For example, the operation unit 204 has a liquid crystal display (LCD) screen having a touch panel, displays operation screens to the user, and receives operations from the user. The operation unit 204 will be described in detail below.

FIG. 3A is a diagram illustrating a configuration of the image processing server 105. The image processing server 105 includes a CPU 301, a RAM 302, an HDD 303, and a network I/F 304. The CPU 301 can control the entire apparatus and control data transmission and reception to/from the RAM 302, the HDD 303, and the network I/F 304. The CPU 301 reads a control program (instructions) from the HDD 303, loads the control program into the RAM 302, and executes the instructions stored in the RAM 302. The image processing server 105 can perform image processing on image data received from the image forming apparatus 101 via the network I/F 304. Image processing that can be executed by the image processing server 105 include Optical Character Recognition (OCR) processing on image data and block division processing for dividing image data into area blocks for each of elements, such as character strings and background in the image data.

FIG. 3B is a diagram illustrating a configuration of the storage server 107. The storage server 107 includes a CPU 311, a RAM 312, an HDD 313, and a network I/F 314. The CPU 311 can control data transmission and reception to/from the RAM 312, the HDD 313, and the network I/F 314. The CPU 311 also reads a control program (instructions) from the HDD 313, loads the control program into the RAM 312, and executes the instructions stored in the RAM 312. The HDD 313 can accumulate image data received from the image processing server 105 via the network I/F 304. The storage server 107 can store received image data in the HDD 313 after attaching a metadata template and metadata associated with the metadata template to the image data. A metadata template refers to a definition of a key type and a value type (data format of a value) of the metadata to be attached to the image data. The metadata template can be preset for each purpose of use of a form. Tables 1 and 2 illustrate examples of metadata templates that can be set for image data.

the metadata template 'Accounting' is set will be described below. Metadata to be attached to a form image include metadata keys and metadata values. Metadata item names can be set to metadata keys to be attached to a form image, and accordingly Key types defined in metadata templates are set to the metadata keys. Values corresponding to metadata keys can be extracted from the form image and set to metadata values. Types (data formats) are defined for metadata values based on metadata templates, and the data corresponding to value types are set to metadata values. Examples of value types include text type, date type, numeric type, and selection type. The text type indicates any character string. The date type indicates a character string with a date format. The numeric type indicates a character string representing a number or an amount of money. The selection type indicates data to be selected from predetermined options by the user.

Referring to the example illustrated in Table 1, in a case where the metadata template 'Accounting' is selected, 'Subject Number' is included as a metadata key in the metadata template and a text type value can be set as a metadata value corresponding to the metadata key. The example illustrated in Table 1 indicates a case in which, a certain form image is processed, a value "ABC-123" is extracted from the form image and the value is set as the metadata value.

The metadata template 'Accounting' further includes a metadata key 'Due Date' and a date type value can be set as the metadata value. The date type value indicates a type where, in a case of indicating "Oct. 25, 2015", for example, only the regular format such as "Oct. 25, 2015", "Oct. 25, 2015", and "Oct. 25, 2015", can be input. Other formats of the date type are also applicable as long as the date is represented in the regular format.

The metadata template 'Accounting' yet further includes a metadata key 'Total Amount' and a numeric type value can be set as the metadata value. The numeric type indicates a

TABLE 1

| Metadata Template | Accounting | | | Legal Works | | |
| --- | --- | --- | --- | --- | --- | --- |
| | Key | Value Type | Example Value | Key | Value Type | Example Value |
| Metadata | Subject Number | Text Type | ABC-123 | Subject Number | Numeric Type | 123456 |
| | Due Date | Date Type | Oct. 25, 2015 | Client | Text Type | Taro Kawasaki |
| | Total Amount | Numeric Type | 47875000 | Date | Date Type | Dec. 22, 2017 |
| | Document Type | Selection Type | (* See Table B.) | | | |

TABLE 2

| Document Type Option | Estimate Form | Invoice | Order Form |
| --- | --- | --- | --- |

Table 1 illustrates two different metadata templates and the contents of each piece of metadata. The example illustrated in Table 1 include two different metadata templates 'Accounting' and 'Legal Works' according to the purpose of use. Different metadata key types can be set for each of the metadata templates. Referring to the example illustrated in Table 1, in a case where the metadata template 'Accounting' is set, for example, 'Subject Number', 'Due Date', 'Total Amount', and 'Document Type' can be set for metadata key types. Meanwhile, in a case where the metadata template 'Legal Works' is set, 'Subject Number', 'Client', and 'Date' can be set for metadata key types. An example case where type where only a numeric value can be input. In the example illustrated in Table 1, a value "47875000" is extracted for the metadata key 'Total Amount' from the form image and set the value as the metadata value. Character strings other than numeric values cannot be added as metadata values of the numeric type.

The metadata template 'Accounting' yet further includes a metadata key 'Document Type' and a selection type value can be set as the metadata value. In the example illustrated in Table 1, a metadata value can be selected from among the values illustrated in Table 2 for the metadata key 'Document Type'. In the example illustrated in Table 2, a value only from among 'Estimate Form', 'Invoice', and 'Order Form' can be set for 'Document Type'. In a case where a metadata key of the selection type is set, it is necessary for the user or administrator to preset a metadata value option for each individual metadata key to the image processing server 105.

In the metadata template 'Legal Works', value types 'Numeric Type', 'Text Type', and 'Date Type' are set to metadata keys 'Subject Number', 'Client', and 'Date', respectively. In the example illustrated in Table 1, "123456", "Taro Kawasaki", and "Dec. 22, 2017" are set as the metadata values extracted from a form image.

In the above-described way, metadata can be attached to image data stored in the HDD 313 of the storage server 107, based on the definition of a metadata template. This enables the user to search for image data by specifying a metadata key for the storage server 107. For example, in the example illustrated in Table 1, the user can search for image data based on the metadata template 'Accounting', and search for image data based on the metadata template 'Accounting' while specifying 'Order Form' for 'Document Type'. This means that the user can search for image data by specifying a desired metadata key, and therefore a search can be performed with higher accuracy.

In addition, attaching metadata to image data stored in the HDD 313 of the storage server 107 facilitates smooth cooperation with the subsequent system. For example, when registering document image data to an accounting system, the user sometimes needs to input accounting information related to the document image. In such a case, if no accounting information is attached to the document image as metadata, the user needs to input accounting information while checking contents of the document image. According to the present exemplary embodiment, when image data is uploaded to the storage server 107, metadata to be used for the subsequent system can be attached to the image data in advance. This enables the metadata to be transferred and registered as it is from the storage server 107 to the accounting system, and therefore efficiency of posting is increased.

FIG. 4 illustrates an example of the operation unit 204 of the image forming apparatus 101. The operation unit 204 includes a touch panel 401, a set key 402, a cancel key 404, and a start key 403. The user sets each job using the touch panel 401 and the set key 402 and presses the start key 403 to start a job. A job once started can be canceled by pressing the cancel key 404 during job execution. Examples of jobs include a copy job, and transmitting image data (scanned via the network I/F 214) to the image processing server 106.

Descriptions will be given of a series of processing procedures for attaching metadata defined by a metadata template to image data acquired by scanning a document by the image forming apparatus 101 and transmitting the image data to the storage server 107.

Figure 5:
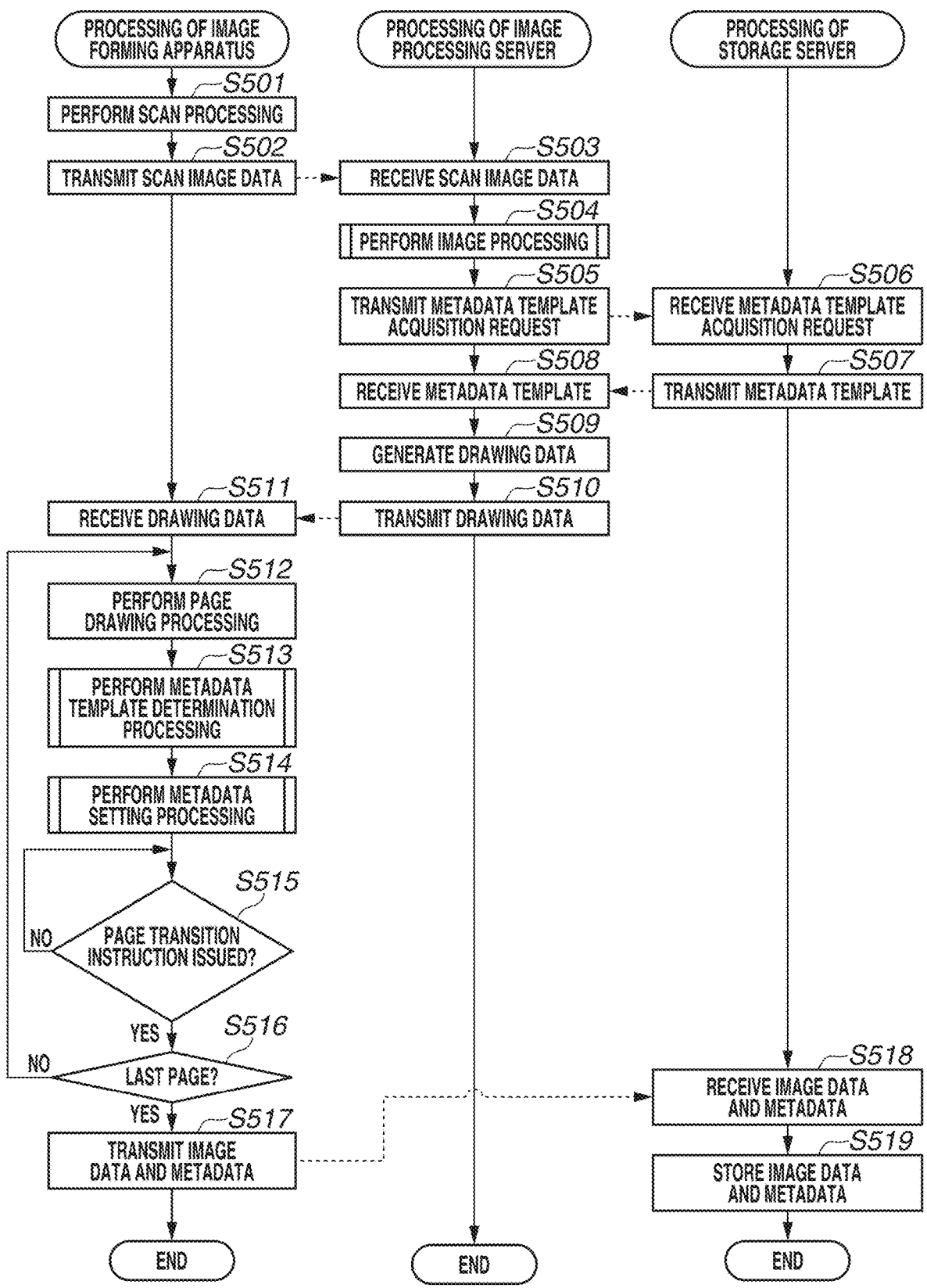
FIG. 5 is a flowchart illustrating overall processing procedure of the image processing system.

FIG. 5 is a flowchart illustrating processing procedures of the entire system according to the present exemplary embodiment. Processing in steps S501 and S502 and processing in steps S511 to S517 are performed by the image forming apparatus 101. The programs related to these pieces of processing are stored in the HDD 213, and are loaded into the RAM 212 and executed by the CPU 211. Processing in steps S503 to S510 is performed by the image processing server 105. The program related to the processing is stored in the HDD 303, and is loaded into the RAM 302 and executed by the CPU 301. Processing in steps S506 and S507 and processing in steps S518 and S519 are performed by the storage server 107. The programs related to these pieces of processing are stored in the HDD 313, and are loaded into the RAM 312 and executed by the CPU 311.

Upon reception of a document scan instruction issued by the user pressing the start key 403, in step S501, the CPU 211 instructs the scanner 203 to scan a document and acquires scan image data generated by the scanner 203. In step S502, the CPU 211 transmits the image data acquired in step S501 to the image processing server 105 via the network I/F 214.

Figure 6:
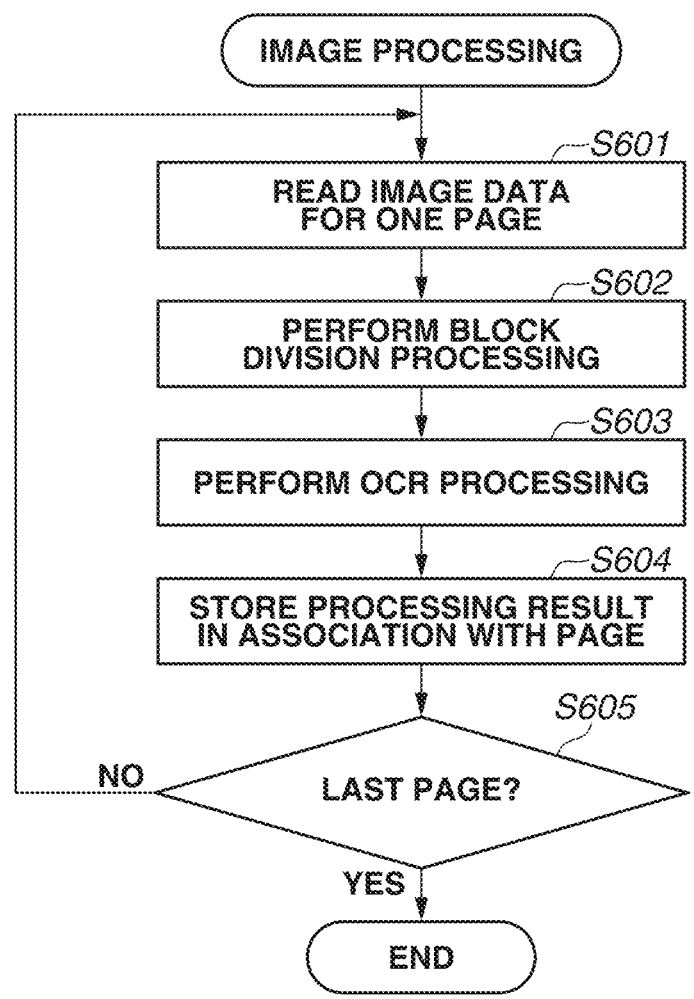
FIG. 6 is a flowchart illustrating processing procedure which is performed by an image processing server.

In step S503, the CPU 301 of the image processing server 105 receives the image data from the image forming apparatus 101 via the network I/F 304. In step S504, the CPU 301 performs image processing on the received image data to generate data to be used when metadata is attached to the image data. FIG. 6 is a flowchart illustrating details of the image processing performed by the image processing server 105 in step S504. The program related to the processing of the flowchart illustrated in FIG. 6 is stored in the HDD 303 of the image processing server 105, and is loaded into the RAM 302 and executed by the CPU 301.

In step S601, the CPU 301 reads image data for one page included in the image data received in step S503. In step S602, the CPU 301 performs the block division processing on the image data for one page read in step S601. The block division processing refers to processing for analyzing a content (form structure) of the image data and dividing the image data into the background area and character string areas. A result of the block division processing is stored in the HDD 303. In the result of the block division processing, an attribute of each area obtained by the block division processing, i.e., information about which of the background area and the character string area is attributed to each area, is associated with position information about a corresponding area on the image data. According to the present exemplary embodiment, each area on the image data is expressed as a square, and position information for each area is expressed by a combination of the coordinates of the top left point of the area, the width of the square, and the height of the square. Hereinafter, a square area for each character string area acquired by the block division processing is referred to as a "block". The shape of each division area acquired by the block division processing is not limited to a square shape but may be defined as an any shape as long as each division area is uniquely expressed.

In step S603, the CPU 301 reads the block division result stored in the HDD 303 in step S602, performs OCR processing on each division area having the character string attribute, and acquires the character code of the character string included in the character string area. In step S604, the CPU 301 associates the character code information for each character string area acquired in step S603, the position information for the character string area acquired in step S602, and the page image data read in step S601 with each other and stores them in the HDD 303. In step S605, the CPU 301 determines whether any piece of the page image data among the image data received in step S503 is not processed by the processing in steps S601 to S604. In a case where a piece of the page image data not yet processed exists (NO in step S605), the processing returns to step S601. Then, the CPU 301 repetitively performs the processing in steps S601 to S604 for the number of pieces of the remaining page image data. Meanwhile, in a case where such a piece of the page image data does not exist (YES in step S605), the processing of the flowchart ends. By performing the image processing in the image processing server 105 by the above-described procedures, the character string information included in each piece of page image data of the document received from the image forming apparatus 101 and the position information for each character string area which are associated with each other can be acquired.

The description of the flowchart illustrated in FIG. 5 will be resumed. In step S505, the CPU 301 that has performed the processing in step S504 described above with reference to FIG. 6 issues a metadata template acquisition request to the storage server 107 via the network I/F 304. In step S506, the CPU 311 of the storage server 107 receives the metadata template acquisition request from the image processing server 105 via the network I/F 314. In step S507, the CPU 311 transmits the metadata templates stored beforehand in the HDD 313 to the image processing server 105. According to the present exemplary embodiment, the metadata templates illustrated in Tables 1 and 2 are transmitted to the image processing server 105.

In step S508, the CPU 301 of the image processing server 105 receives the metadata templates from the storage server 107 via the network I/F 304 and stores the metadata templates in the HDD 303. In step S509, the CPU 301 generates drawing data of a screen which is for receiving instructions from the user when metadata is attached to the scan image data. The generated screen drawing data is data for a screen to be displayed on the touch panel 401 of the image forming apparatus 101. According to the present exemplary embodiment, the drawing data includes page description data described in a web page description language such as Hyper Text Markup Language (HTML) and script data described in a script language such as JavaScript (registered trademark). The page description data further includes, as static data, the image data received in step S503, the image processing result data generated in step S504, and the metadata templates received from the storage server 107 in step S508. The script data includes a control procedure for screen display in accordance with the static data included in the page description data and user instructions input from the operation unit 204 of the image forming apparatus 101. A control procedure for specific screen display on the image forming apparatus 101 using these pieces of data will be described below.

In step S510, the CPU 301 of the image processing server 105 transmits the generated drawing data to the image forming apparatus 101 via the network I/F 304.

In step S511, the CPU 211 of the image forming apparatus 101 receives the drawing data transmitted from the image processing server 105 via the network I/F 214. In step S512, the CPU 211 displays a screen on the touch panel 401 based on the static data included in the received drawing data. The screen displayed in step S512 is a screen for prompting the user of the image forming apparatus 101 to specify the metadata template to be used for each page of the scan image. Therefore, hereinafter, the screen is referred to as a metadata template determination screen.

FIG. 7 is a diagram illustrating an example of a metadata template determination screen 701 displayed on the touch panel 401 in step S512. The metadata template determination screen 701 includes a preview display portion 702, a page count display portion 703, a selected metadata template display portion 704, a drop-down list button 705, and a page transition instruction portion 706. The preview display portion 702 displays the scan image in page units. The page count display portion 703 displays the page number of the page image currently displayed in the preview display portion 702. In the example illustrated in FIG. 7, the first page of the scan image data including two pages is displayed. The selected metadata template display portion 704 displays the metadata template currently selected in the displayed page image. The example illustrated in FIG. 7 indicates a state before receiving a user instruction, where no metadata template is selected for the page image displayed in the preview display portion 702. The drop-down list button 705, when pressed, displays a list of metadata templates selectable for the displayed page image. An example of screen display when the drop-down list button 705 is pressed will be described below. The page transition instruction portion 706 displays buttons which is used by the user to make display transition between pages of the scan image data generated in step S501. In this example, since the first page of the scan image data including two pages is displayed, only the button for selecting the following page is displayed. The page transition instruction portion 706 is configured to dynamically change the display contents for each page. For example, when the second page is displayed as the last page, the button for transmitting the image data and the metadata to the storage server 107 is displayed.

In step S513, based on an operation by the user of the image forming apparatus 101, the CPU 211 performs processing for determining a metadata template to be associated with the page image displayed in the metadata template determination screen.

Figure 8:
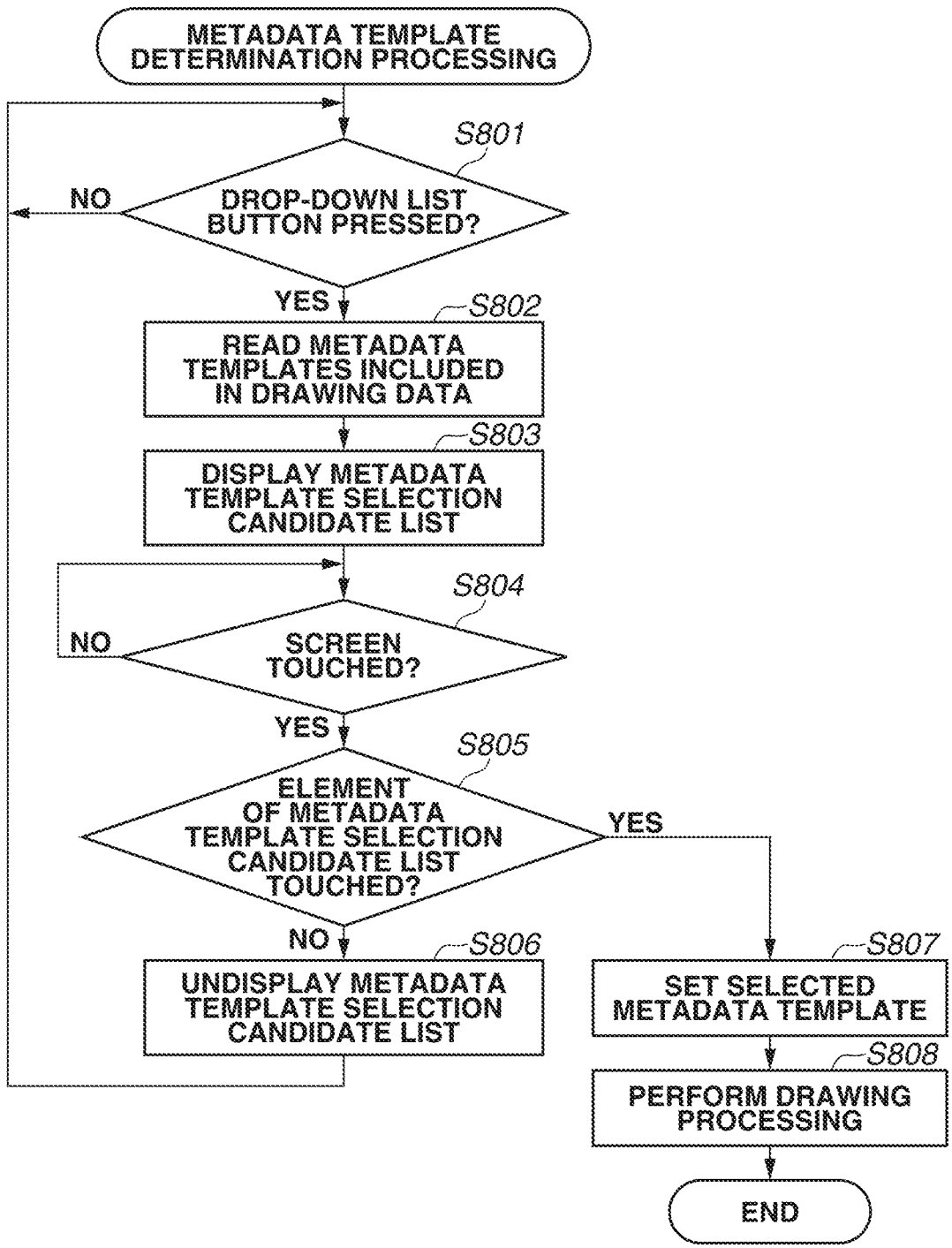
FIG. 8 is a flowchart illustrating processing procedure which is performed by the image forming apparatus.

FIG. 8 is a flowchart illustrating detailed procedures of the metadata template determination processing in step S513. The program related to the processing of this flowchart is included in the data received in step S511, and is loaded into the RAM 212 and executed by the CPU 211.

In step S801, the CPU 211 determines whether the drop-down list button 705 in the metadata template determination screen illustrated in FIG. 7 is pressed by the user. In a case where the button is not pressed (NO in step S801), the CPU 211 repetitively performs the determination in step S801 until the button is pressed. Meanwhile, in a case where the button is pressed (YES in step S801), the processing proceeds to step S802. In step S802, the CPU 211 reads a list of a plurality of metadata templates included in the data received in step S511 as static data. In step S803, the CPU 211 displays the list of the plurality of metadata templates read in step S802 on the touch panel 401.

FIG. 9 is a diagram illustrating an example of a screen displayed on the touch panel 401 when the CPU 211 performs step S803. The CPU 211 displays the metadata templates read in step S802, as a metadata template selection candidate list 901, on the metadata template determination screen 701 described above with reference to FIG. 7. In this example, since the metadata templates illustrated in Table 1 are included in the screen data, 'Accounting' and 'Law Works' are displayed in the metadata template selection candidate list 901. From the metadata template selection candidate list 901, the user can select the metadata template to be associated with the page image displayed on the metadata template determination screen 701.

The description of the flowchart illustrated in FIG. 8 will be resumed. In step S804, the CPU 211 determines whether the touch panel 401 is touched by the user. In a case where the touch panel 401 is not touched (NO in step S804), the CPU 211 repetitively performs the processing in step S804. Meanwhile, in a case where the touch panel 401 is touched (YES in step S804), the processing proceeds to step S805. In step S805, the CPU 211 determines whether the touched position is the metadata template selection candidate list 901. In a case where the touched position is not the metadata template selection candidate list 901 (NO in step S805), the processing proceeds to step S806. In step S806, the CPU 211 stops displaying the metadata template selection candidate list 901 and redisplays the screen illustrated in FIG. 7. Then, the processing returns to step S801. Meanwhile, in a case where the touched position is the metadata template selection candidate list 901 (YES in step S805), the processing proceeds to step S807. In step S807, the CPU 211 sets the metadata template selected as a selection target from the metadata template selection candidate list 901 by the user, and in step S808, the CPU 211 displays a screen on the touch panel 401. The processing of this flowchart ends. The screen displayed in step S808 is used by the user of the image forming apparatus 101 to set metadata to each page of the scan image based on the metadata template set in step S807. This screen is referred to as a metadata setting screen.

Figure 10A:
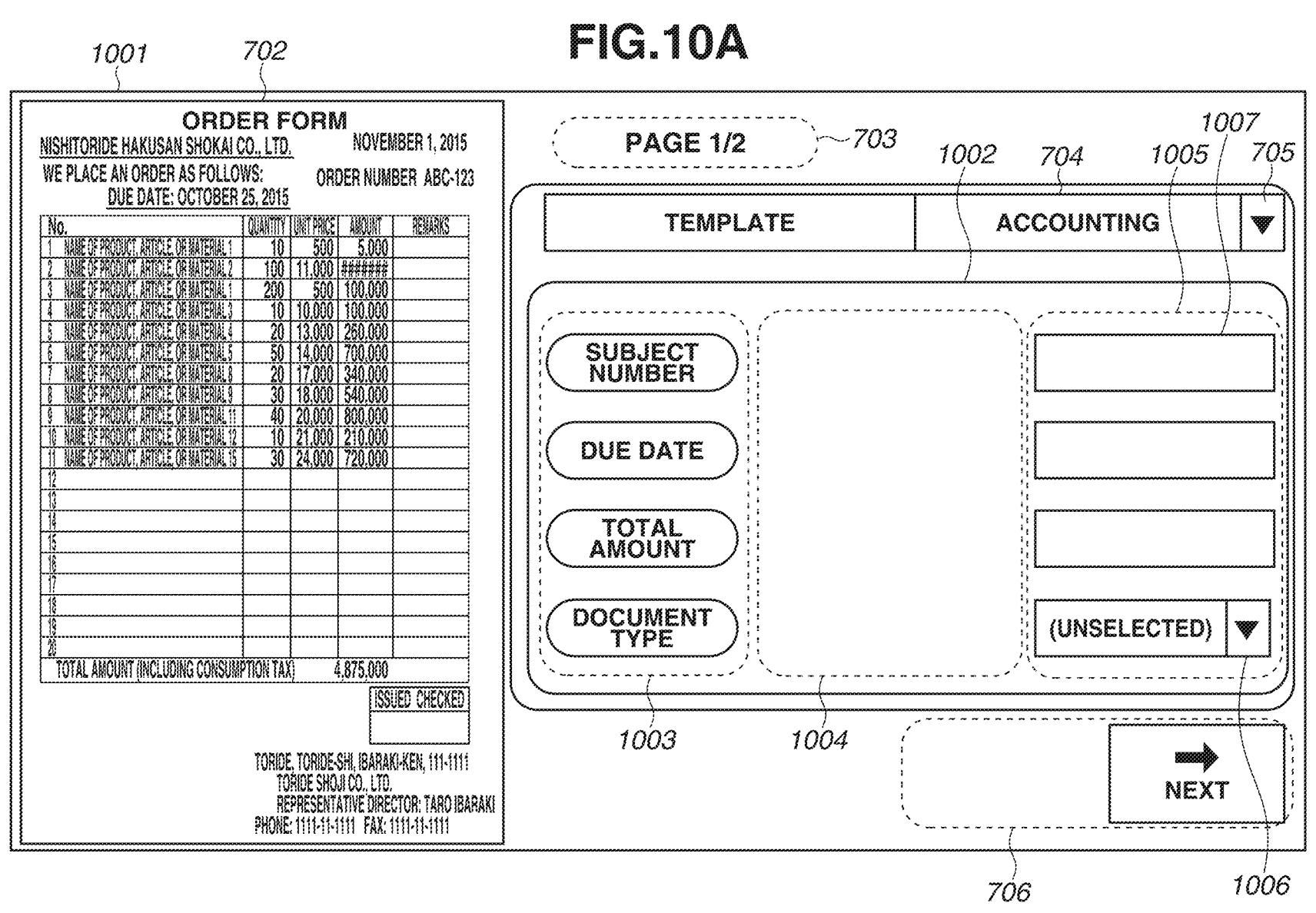

FIG. 10A illustrates an example of a metadata setting screen 1001 displayed on the touch panel 401 by the CPU 211 in step S808. The metadata setting screen 1001 includes the metadata template determination screen 701 illustrated in FIG. 7 and a metadata setting portion 1002 additionally displayed. The metadata setting portion 1002 includes a metadata key display portion 1003, a metadata value image display portion 1004, and a metadata value input form (value input field) 1005.

The metadata key display portion 1003 is configured to dynamically change in accordance with the script data included in the data received in step S511 according to the metadata template selected and set in step S807. In the example illustrated in FIG. 10A, since the metadata template 'Accounting' is set to the image of the first page of the scan image, the metadata keys 'Subject Number', 'Due Date', 'Total Amount', and 'Document Type' associated with the metadata template 'Accounting' illustrated in Table 1 are displayed in forms of buttons. In a case where the user of the image forming apparatus 101 selects any one of other metadata templates from the above-described metadata template selection candidate list 901, the metadata key display portion 1003 dynamically changes to display the metadata key corresponding to the selected metadata template.

The metadata value image display portion 1004 is an area for displaying, in an enlarged manner, the image of the block portion selected by the user from among the blocks displayed in the preview display portion 702 in processing described below. The user can check the metadata value to be set as the value of the metadata key by checking the image displayed in the metadata value image display portion 1004. The metadata value input form 1005 includes input fields for setting metadata values associated with corresponding metadata keys in processing described below.

The description of the flowchart illustrated in FIG. 5 will be resumed. Upon completion of the metadata template determination processing in step S513, then in step S514, the CPU 211 of the image forming apparatus 101 performs the metadata setting processing.

Figure 11:
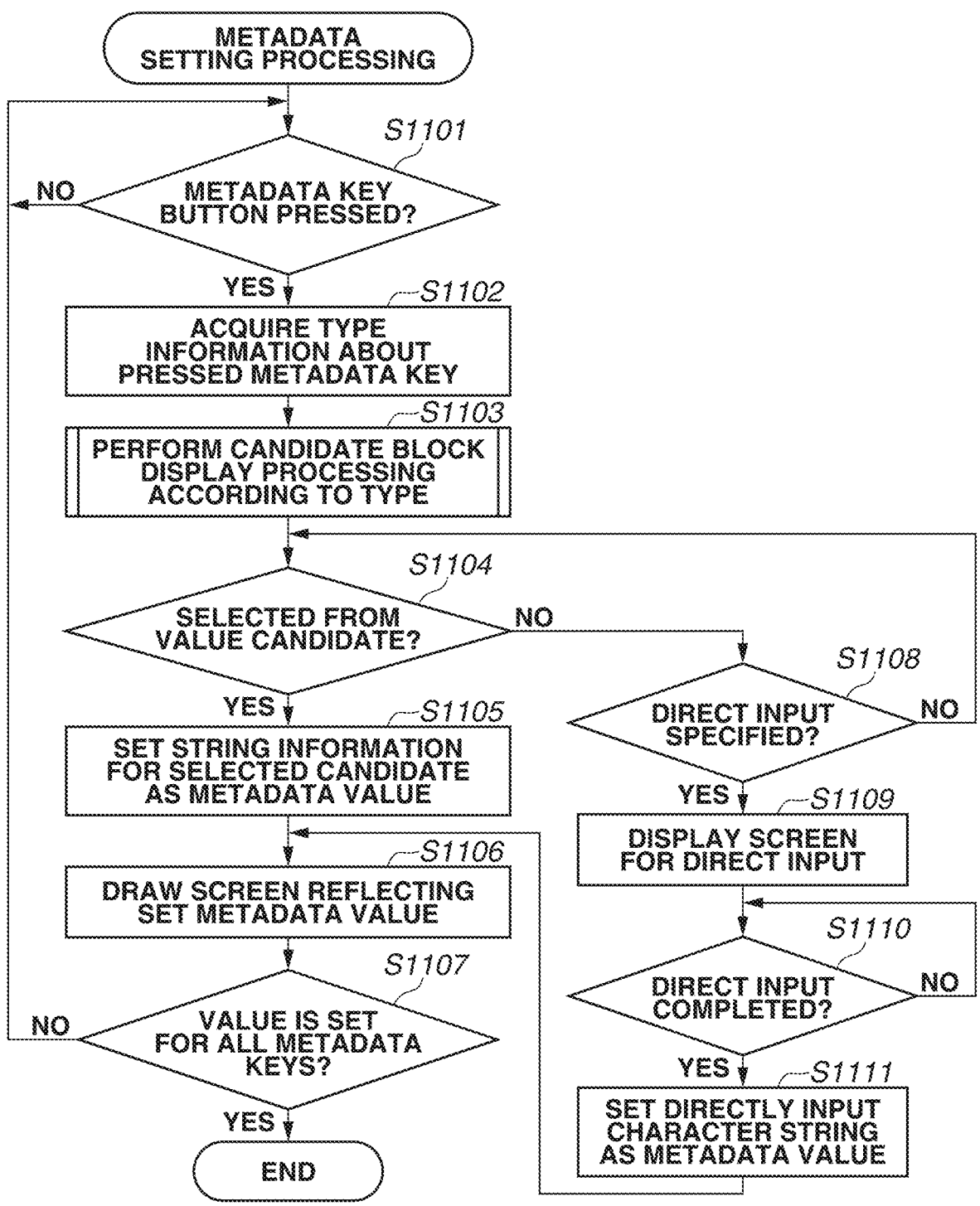
FIG. 11 is a flowchart illustrating processing procedure which is performed by the image forming apparatus.

FIG. 11 is a flowchart illustrating detailed procedures of the metadata template determination processing in step S514. The program related to the processing of this flowchart is included in the data received in step S511, and is loaded into the RAM 212 and executed by the CPU 211.

In step S1101, the CPU 211 determines whether any button for the metadata keys displayed in the metadata key display portion 1003 in the metadata setting screen 1001 is pressed. In a case where no button is pressed (NO in step S1101), the CPU 211 continues the determination processing in step S1101. Meanwhile, in a case where any button is pressed (YES in step S1101), the processing proceeds to step S1102. In step S1102, the CPU 211 reads the type information for the metadata key corresponding to the pressed button from the information about the metadata template currently being selected in the selected metadata template display portion 704. In step S1103, the CPU 211 performs candidate block display processing corresponding to the type information for the metadata key acquired in step S1102.

Figure 12:
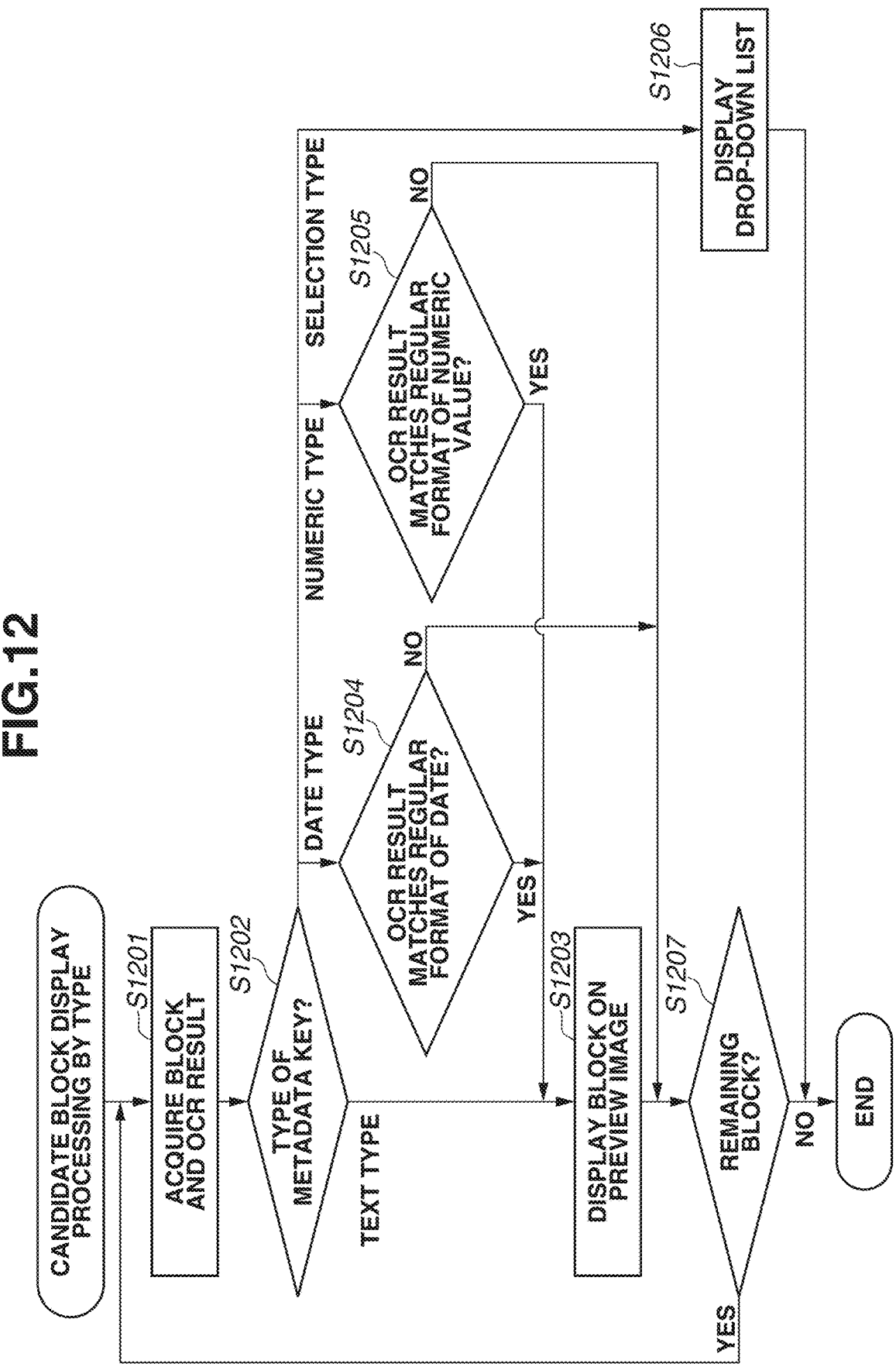
FIG. 12 is a flowchart illustrating processing procedure which is performed by the image forming apparatus.

FIG. 12 is a flowchart illustrating detailed processing in step S1103. The program related to the processing of the flowchart is included in the data received in step S511, and is loaded into the RAM 212 and executed by the CPU 211.

In step S1201, the CPU 211 acquires, as processing targets, block information about one block (one character string area) in the page image data and OCR result information (character recognition result information) corresponding to the block which are included in the drawing data as a result of the image processing in step S504. In step S1202, the CPU 211 determines the type information for the metadata key acquired in step S1102.

In a case where the CPU 211 determines the type information as the text type (TEXT TYPE in step S1202), the processing proceeds to step S1203. In step S1203, based on the position information included in the block information acquired in step S1201, the CPU 211 displays the candidate block in a square shape at the appropriate position on the preview display portion 702. Examples of candidate block display will be described below with reference to accompanying drawings.

In a case where the CPU 211 determines the type information as the date type (DATE TYPE in step S1202), the processing proceeds to step S1204. In step S1204, the CPU 211 determines whether the OCR result information included in the block information acquired in step S1201 matches a date regular format. In a case where the CPU 211 determines that the OCR result information matches the regular format (YES in step S1204), the processing proceeds to step S1203. In step S1203, the CPU 211 displays the corresponding block in a square shape as a candidate block. Meanwhile, in a case where the CPU 211 determines that the OCR result information does not match the regular format (NO in step S1204), the processing proceeds to step S1207. The date regular format that is used in the determination in step S1204 is included as script data in the drawing data received in step S511. Examples of specific date formats include regular formats, such as "\d{1,4}[/\-\.]\d{1,2}[/\-\.]\d{1,4}" and so on. However, the format does not matter as long as it is one of the generally recognizable date formats. According to these regular formats, the CPU 211 displays, as candidate blocks in a square shape, only blocks of which OCR result information has the date format, such as "Nov. 5, 1979", "Nov. 5, 1979", and so on, at the appropriate position on the preview display portion 702 by the above-described processing in step S1203. Examples of candidate block display will be described below with reference to the accompanying drawings.

In a case where the CPU 211 determines the type information as the numeric type (NUMERIC TYPE in step S1202), the processing proceeds to step S1205. In step S1205, the CPU 211 determines whether the OCR result information included in the block information acquired in step S1201 matches a numeric regular format. In a case where the CPU 211 determines that the OCR result information matches the regular format (YES in step S1205), the processing proceeds to step S1203. In step S1203, the CPU 211 displays the block in a square shape as a candidate block. Meanwhile, in a case where the CPU 211 determines that the OCR result information does not match the regular format (NO in step S1205), the processing proceeds to step S1207. The numeric regular format that is used for the determination in step S1205 is included as script data in the drawing data received in step S511. Examples of specific numeric formats include regular formats, such as "[0-9]*$" and "^\d{1,3}(,\d{3})*$". However, the format does not matter as long as it is one of the generally recognizable numeric formats. According to the above-described regular formats, the CPU 211 displays, as candidate blocks in a square shape, only blocks of which OCR result information has the numeric format, such as "123456", "246000", and "143,000,000", at the appropriate position on the scan image in the preview display portion 702 by the above-described processing in step S1203. Examples of candidate block display will be described below with reference to the accompanying drawings.

In a case where the CPU 211 determines the type information as the selection type (SELECTION TYPE in step S1202), the processing proceeds to step S1206. In step S1206, the CPU 211 displays a list of metadata value selection candidates, as illustrated in Table 2, on the metadata value input form 1005. Examples of list display will be described below with reference to the accompanying drawings. Upon completion of step S1206, the processing of the flowchart ends.

Upon completion of step S1203, the processing proceeds to step S1207. In step S1207, the CPU 211 determines whether any piece of block information among the block information in the page image data included in the drawing data as a result of the image processing in step S504 is unprocessed in step S1201. In a case where any block is unprocessed (YES in step S1207), the processing returns to step S1201. In step S1201, the CPU 211 processes the next block. Meanwhile, in a case where all blocks have been processed (NO in step S1207), the processing of the flowchart ends.

When the processing of the flowchart described above with reference to FIG. 12 ends, the processing returns to the flowchart illustrated in FIG. 11. In step S1104, the CPU 211 determines whether the user selects the block displayed as a setting candidate of the metadata value corresponding to the metadata key in step S1203 or a selection candidate on the list displayed in step S1206. In a case where no selection candidate is selected (NO in step S1104), the processing proceeds to step S1108. In step S1108, the CPU 211 determines whether the user directly inputs a metadata value in a metadata value input field. Directly inputting a metadata value refers to a user's operation to directly input a desired metadata value by using the operation unit 204 when the character string block desired by the user does not exist in the selection candidate blocks displayed in step S1203 or when a candidate block corresponding to the type information of the selected metadata key does not exist. Alternatively, the user may directly input a metadata value, for example, by touching an area (e.g., an input form 1007 corresponding to the metadata key 'Subject Number') of the metadata value input form 1005 or performs other methods. In a case where the user does not directly input a metadata value in this way (NO in step S1108), the processing returns to step S1104. Meanwhile, in a case where the user directly inputs a metadata value (YES in step S1108), the processing proceeds to step S1109. In step S1109, the CPU 211 displays a screen for directly inputting a metadata value on the touch panel 401.

FIG. 10B illustrates an example of a screen displayed on the touch panel 401 in step S1109. A software keyboard 1008 is overlapped with the screen illustrated in FIG. 10A. By operating the software keyboard 1008, the user can directly input a metadata value corresponding to the metadata key selected in step S1101. After directly inputting a metadata value, the user presses an 'OK' button 1009 to notify the CPU 211 of direct input completion. In step S1110, the CPU 211 determines whether the notification of user's direct input completion is received. in a case where the notification is not received (NO in step S1110), the CPU 211 continues the processing in step S1110. Meanwhile, in a case where the notification is received (YES in step S1110), the processing proceeds to step S1111. In step S1111, the CPU 211 sets the character string directly input by the user in the specified input form (e.g., the input form 1007) of the metadata value input form 1005. Step S1106 will be described below.

The description of the processing in step S1104 will be resumed. When the user selects the block displayed as a setting candidate of the metadata value in step S1203 or a selection candidate in the list displayed in step S1206 (YES in step S1104), the processing proceeds to step S1105. In step S1105, the CPU 211 acquires the OCR result information for the setting candidate block of the selected metadata value or the string information corresponding to the selection candidate on the list, and sets the character string information in the appropriate input field (e.g., the input form 1007) of the metadata value input form 1005. In step S1106, the CPU 211 draws a screen that reflects the metadata value set in step S1105. An example of a screen drawn in step S1106 will be described below with reference to the accompanying drawings.

In step S1107, the CPU 211 determines whether the metadata values corresponding to all of the metadata keys displayed in the metadata key display portion 1003 are set. In a case where any metadata key to which a metadata value is not set exist (NO in step S1107), the processing returns to step S1101. Meanwhile, in a case where a metadata value is set for all of the metadata keys (YES in step S1107), the CPU 211 ends the metadata setting processing in this flowchart.

When the processing of the flowchart described above with reference to FIG. 11 ends, the processing returns to the flowchart illustrated in FIG. 5. After completion of the metadata setting processing, then in step S515, the CPU 211 determines whether a page transition instruction is received from the user. The page transition instruction refers to a user's button pressing operation in the page transition instruction portion 706.

In a case where a page transition instruction is not received (NO in step S515), the CPU 211 continues the processing in step S515. Meanwhile, in a case where a page transition instruction is received (YES in step S515), the processing proceeds to step S516. In step S516, the CPU 211 determines whether the current page image is the last page of the scan image data.

In a case where the current page is not the last page (NO in step S516), the processing returns to step S512. In step S512, the CPU 211 performs the processing again for the next page image to which a metadata template and metadata are set among the scan image data. Meanwhile, in a case where the current page is the last page (YES in step S516), the processing proceeds to step S517. In step S517, the CPU 211 transmits the scan image data together with the metadata added to each page in steps S513 and S514, to the storage server 107 via the network I/F 214 for registration. While, in the present exemplary embodiment, the metadata set to each page of the scan image data is transmitted to the storage server 107 in a case where the last page is displayed when a page transition instruction is issued by the user, the method for issuing a metadata transmission instruction is not limited thereto. For example, a button for a metadata transmission instruction may be further provided, and after metadata has been set to each page of the scan image data, the metadata may be transmitted to the storage server 107 when a metadata transmission instruction is issued by the user.

In step S518, the CPU 311 of the storage server 107 receives the image data and the metadata transmitted in step S517, via the network I/F 314. In step S519, the CPU 311 stores the image data and the metadata in the HDD 313. Then, the processing of the flowchart of the entire system illustrated in FIG. 5 ends. The page image data and the metadata are associated with each other and stored in the storage server 107 in step S519, and therefore the user of the storage server 107 can search for page image data on the storage server 107 by using the metadata key and the metadata value.

The above-described processing makes it easier for the user of the image forming apparatus 101 to attach the metadata to each piece of page image data of the scan image data. Specific examples will be described below with reference to the accompanying drawings.

Descriptions will be given of a case in a state where the screen illustrated in FIG. 10A is displayed by the processing in steps S501 to S513. Then, for example, the user of the image forming apparatus 101 presses the button for the metadata key 'Subject Number' in the screen illustrated in FIG. 10A. The CPU 211 detects the depression of the button in step S1101 and acquires the type information ('Text Type') in step S1102. Based on the type information ('Text Type'), the CPU 211 repetitively performs the processing in steps S1201 to S1203 and S1207 for the number of blocks in the page image data illustrated in FIG. 10A. As a result of the processing, the screen as illustrated in FIG. 13A is displayed. For metadata keys of 'Text Type', any character string can be set as metadata values, and therefore all blocks on the page image become selection candidates, as illustrated in FIG. 13A.

In step S1104, for example, the user selects a block 1302. In this case, the display screen in which a metadata value is set in steps S1105 and S1106 is as illustrated in FIG. 13B. As illustrated in FIG. 13B, the character string "ABC-123" corresponding to the block 1302 is set in the metadata value input form 1305 corresponding to the metadata key 'Subject Number', and the image of the selected block 1302 is extracted and displayed in a block 1304 in an enlarged manner Displaying the image in this way enables the user to check whether the metadata value set in the metadata value input form 1305 matches the character string actually described in the selected block of the image data.

After completion of the processing in step S1107, then in step S1101, for example, the user presses the button for the metadata key 'Due Date'. Since the metadata key 'Due Date' is of 'Date Type', the CPU 211 performs processing in steps S1102, S1201, S1202, and S1204 in this order. The CPU 211 performs step S1203 only for blocks determined to match a date regular format out of the page image data. As a result of the processing, the screen as illustrated in FIG. 14A is displayed. Among the page image data displayed in the preview display portion 702, only a block 1402 (character string "Nov. 1, 2015") and a block 1403 (character string "Oct. 25, 2015") are each displayed in a square shape as metadata value candidate blocks. In step S1104, for example, the user selects the block 1403. In this case, the display screen in which a metadata value is set in steps S1105 and S1106 is as illustrated in FIG. 14B. As illustrated in FIG. 14B, the character string "Oct. 25, 2015" corresponding to the block 1403 is set in the metadata value input form 1406 corresponding to the metadata key 'Due Date', and the image of the selected block 1403 is extracted and displayed in a block 1405 in an enlarged manner.

Figure 15A:
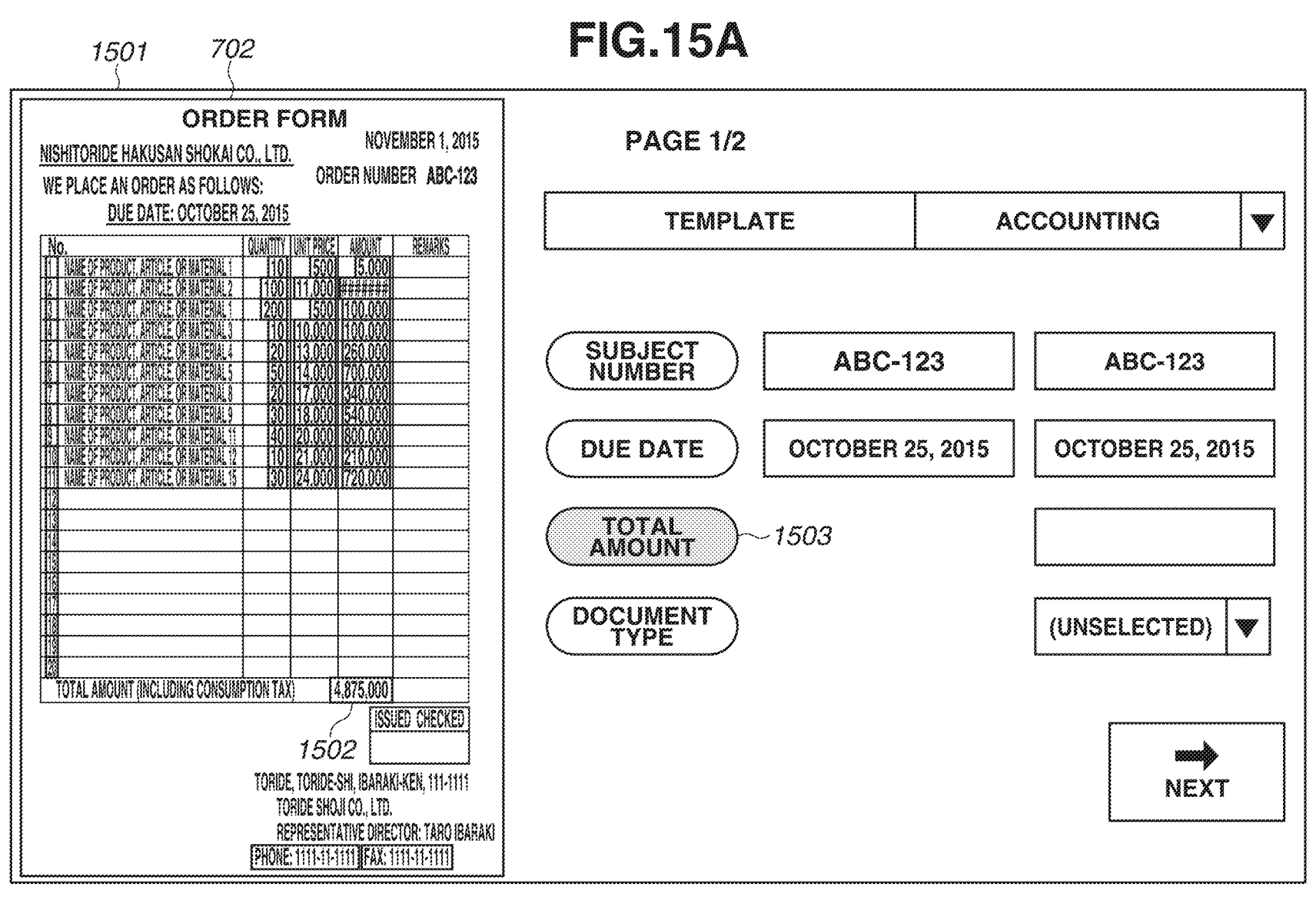

After completion of the processing in step S1107, then in step S1101, for example, the user presses the button for the metadata key 'Total Amount'. Since the metadata key 'Total Amount' is of 'Numeric Type', the CPU 211 performs processing in steps S1102, S1201, S1202, and S1205 in this order. The CPU 211 performs step S1203 only for blocks determined to match a numeric regular format out of the page image data. As a result of the processing, the screen as illustrated in FIG. 15A is displayed. Among the page image data displayed in the preview display portion 702, only blocks including a numeric character string are each displayed in a square shape as metadata value candidate blocks. In step S1104, for example, the user selects a block 1502 (character string '4,875,000'). In this case, the display screen in which metadata values are set in steps S1105 and S1106 is as illustrated in FIG. 15B. As illustrated in FIG. 15B, the numeric character string '4875000' corresponding to the block 1502 is set in the metadata value input form 1505 corresponding to the metadata key 'Total Amount', and the image of the selected block 1502 is extracted and displayed in a block 1504 in an enlarged manner According to the present exemplary embodiment, when the OCR result is input in the metadata value input form 1505, delimiters (commas) are eliminated from the numeric data (amount data such as '4,875,000') as a numeric value having delimiters such as commas. However, the disclosure is not limited thereto. Numeric values having delimiters such as commas may be input to the metadata value input form 1505 as long as the system is capable of processing numeric values having delimiters such as commas.

After completion of the processing in step S1107, then in step S1101, for example, the user presses the button for the metadata key 'Document Type'. Since the metadata key 'Document Type' is of 'Selection Type', the CPU 211 performs steps S1102, S1201, S1202, and S1206 in this order, and a metadata value selection candidate list is displayed on the metadata value input form 1505. As a result of the processing, the screen as illustrated in FIG. 16A is displayed. As illustrated in FIG. 16A, a list of document type options ('Estimate Form', 'Invoice', and 'Order Form') illustrated in Table 2 is displayed below a metadata value input form 1603. In step S1104, for example, the user selects an element 1604 (the value 'Order Form'). In this case, the display screen in which metadata values are set in steps S1105 and S1106 is as illustrated in FIG. 16B. As illustrated in FIG. 16B, the character string 'Order Form' corresponding to the element 1604 is set in the metadata value input form 1603 corresponding to the metadata key 'Document Type'.

Figure 17:
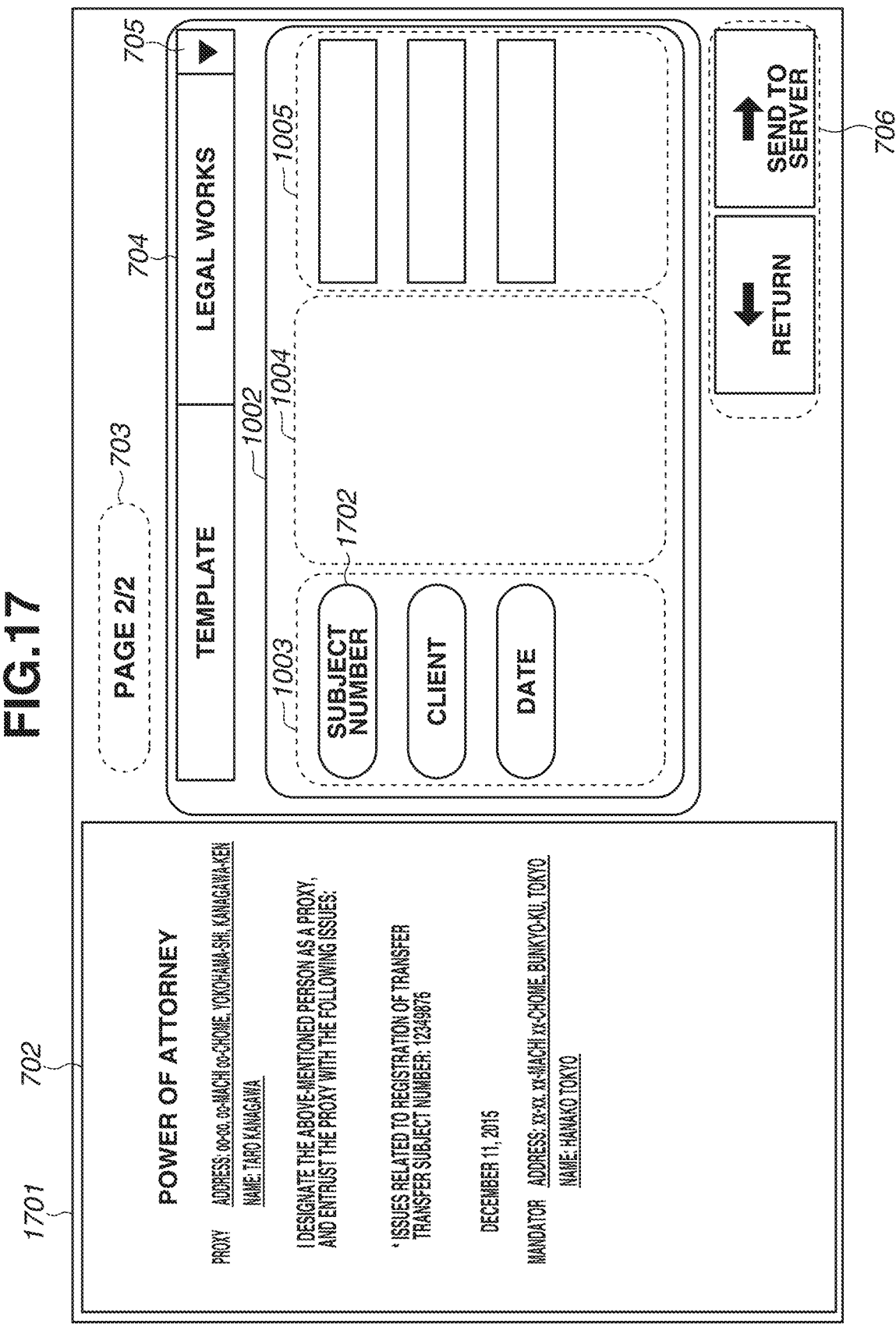
FIG. 17 is a diagram illustrating an example of a screen displayed on the operation unit of the image forming apparatus.

By the above-described processing, the processing in step S514 for the first page of the image data is completed. Then in step S515, for example, the user presses the 'Next' button in the page transition instruction portion 706. In step S516, the second page of the page image data becomes a metadata setting target. After completion of step S512, then in step S513, the CPU 211 performs the metadata template determination processing on the second page of the page image data. For example, the user selects the metadata template 'Legal Works' from the metadata template selection candidate list 901. In this case, the screen displayed as a result of the processing in step S513 is as illustrated in FIG. 17. This screen is almost similar to the metadata setting screen 1001 corresponding to the first page of the page screen data described above with reference to FIG. 10A. The metadata keys 'Subject Number', 'Client', and 'Date' corresponding to the metadata template 'Legal Works' illustrated in Table 1 are displayed in the metadata key display portion 1003. The page number of the page count display portion 703 is updated to the second page, and the buttons displayed on the page transition instruction portion 706 are updated to 'Return' and 'Send to Server'. The 'Return' button is used to make a page transition to the previous page of the page image data, i.e., the first page of the page image data. The 'Send to Server' button is used to transmit the scan image and the metadata to the storage server 107.

In step S1101, in a state where the screen illustrated in FIG. 17 is displayed, for example, the user presses the button 1702 of the metadata key 'Subject Number'. Since the metadata key 'Subject Number' of the metadata template 'Legal Works' is of 'Numeric Type', unlike the first page of the page image data, the CPU 211 performs processing in steps S1102, S1201, S1202, and S1205 in this order. The CPU 211 performs step S1203 only for blocks that match a numeric regular format out of the page image data. As a result of the processing, the screen as illustrated in FIG. 18A is displayed. Among the page image data displayed in the preview display portion 702, only blocks including a numeric character string are each displayed in a square shape as metadata value candidate blocks. In step S1104, for example, the user selects a block 1802 (character string '12349876'). In this case, the display screen in which metadata values are set in steps S1105 and S1106 is as illustrated in FIG. 18B. As illustrated in FIG. 18B, the character string '12349876' including the numeric character string corresponding to the block 1802 is set in the metadata value input form 1804 corresponding to the metadata key 'Subject Number', and the image of the selected block 1802 is displayed in a block 1803 as an excerpted image. The subsequent processing is similar to the processing for the first page of the page image data, and redundant description thereof will be omitted.

As discussed above, according to the present exemplary embodiment, target blocks for metadata value selection candidates and a list of metadata values are dynamically narrowed down and displayed according to the type information set in metadata keys of metadata templates set for each page of the scan image data. Therefore, operability and convenience when the user attaches metadata are improved.

A second exemplary embodiment will be described below centering on an example case where, when displaying candidate blocks according to the selections of metadata keys of the date type and the numeric type, candidate blocks are displayed in consideration of the possibility of a character mis-recognized in the OCR processing. In the descriptions of the second exemplary embodiment, configurations and processing duplicated with those according to the first exemplary embodiment are assigned the same reference numerals, and detailed descriptions thereof will be omitted.

Figure 19:
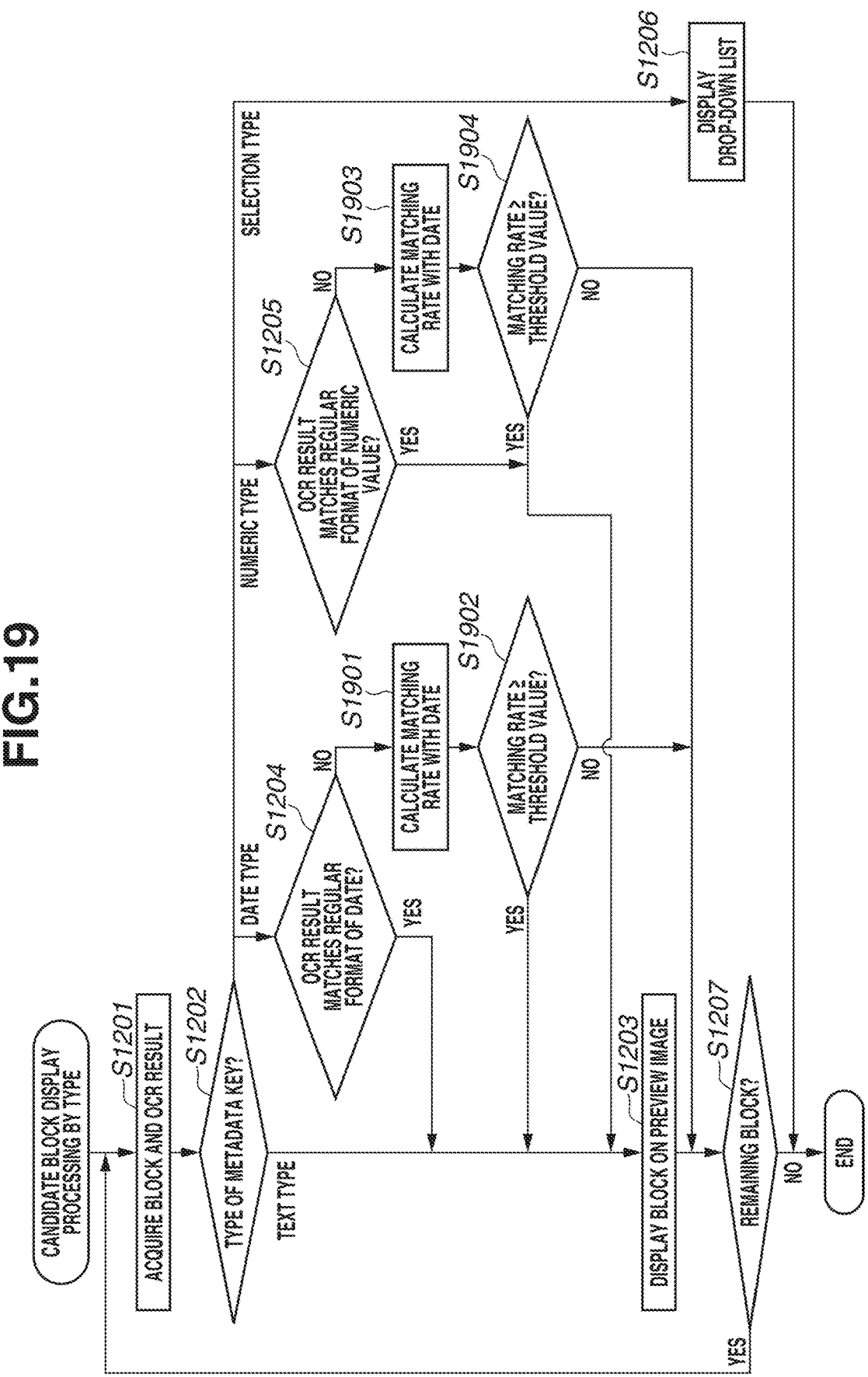
FIG. 19 is a flowchart illustrating processing performed by the image forming apparatus.

FIG. 19 is a flowchart illustrating detailed processing of step S1103 illustrated in FIG. 11 according to the second exemplary embodiment. The program related to the processing of the flowchart is included in the data received in step S511, and is loaded into the RAM 212 and executed by the CPU 211.

In step S1201, like the first exemplary embodiment, the CPU 211 acquires block information for one block (one character string area) in the page image data and OCR result information corresponding to the block as a processing target. In step S1202, like the first exemplary embodiment, the CPU 211 determines the type information for the metadata key acquired in step S1102. In a case where the type information for the metadata key selected by the user of the image forming apparatus 101 is the date type or the numeric type ('DATE TYPE' or 'NUMERIC TYPE' in step S1202), the CPU 211 performs processing in different procedures from the first exemplary embodiment. Processing for each value type will be described below.

In a case where the CPU 211 determines that the type information for the metadata key as the date type (DATE TYPE in step S1202), the processing proceeds to step S1204. In step S1204, the CPU 211 determines whether the OCR result information included in the block information acquired in step S1201 completely matches a date regular format. In a case where the CPU 211 determines that the OCR result information matches a date regular format (YES in step S1204), the processing proceeds to step S1203. In step S1203, the CPU 211 displays the block in a square shape as a candidate block. Meanwhile, in a case where the CPU 211 determines that the OCR result information does not match a date regular format (NO in step S1204), the processing proceeds to step S1901. In step S1901, the CPU 211 calculates the matching rate between the OCR result information for the block acquired in step S1201 and the date regular format. As an example of a method for calculating the matching rate between the OCR result information and the date regular format, the CPU 211 calculates the ratio of the number of matching characters in the date regular format to the total number of characters in the character string in the OCR result information. The matching rate is not limited to the ratio of the number of matching characters but may be obtained using other indexes.

In step S1902, the CPU 211 determines whether the matching rate calculated in step S1901 is larger than or equal to a predetermined threshold value. The threshold value may be a value stored beforehand in the HDD 213 or a value specified by the user by a setting of the image forming apparatus 101. The method for determining the threshold value does not matter. In a case where the matching rate is larger than or equal to the threshold value (YES in step S1902), the processing proceeds to step S1203. In step S1203, the CPU 211 displays the block in a square shape as a candidate block. Meanwhile, in a case where the matching rate is smaller than the threshold value (NO in step S1902), the processing proceeds to step S1207.

In a case where the CPU 211 determines the type information for the metadata key as the numeric type (NUMERIC TYPE in step S1202), the processing proceeds to step S1205. In step S1205, the CPU 211 determines whether the OCR result information included in the block information acquired in step S1201 matches a numeric regular format. In a case where the CPU 211 determines that the OCR result information matches a numeric regular format (YES in step S1205), the processing proceeds to step S1203. In step S1203, the CPU 211 displays the block in a square shape as a candidate block. Meanwhile, in a case where the CPU 211 determines that the OCR result information does not match a numeric regular format (NO in step S1205), the processing proceeds to step S1903. In step S1903, the CPU 211 calculates the matching rate between the OCR result information included in the block information acquired in step S1201 and the numeric regular format. As an example of a method for calculating the matching rate between the OCR result information and the numeric regular format, the CPU 211 calculates the ratio of the number of matching characters in the numeric regular format to the total number of characters in the character string in the OCR result information. The matching rate is not limited to the ratio of the number of matching characters but may be obtained using other indexes.

In step S1904, the CPU 211 determines whether the matching rate calculated in step S1903 is larger than or equal to a predetermined threshold value. The threshold value may be a value stored beforehand in the HDD 213 or a value specified by the user by a setting of the image forming apparatus 101. The method for determining the threshold value does not matter. In a case where the matching rate is larger than or equal to the threshold value (YES in step S1904), the processing proceeds to step S1203. In step S1203, the CPU 211 displays the block in a square shape as a block matching a candidate block. Meanwhile, in a case where the matching rate is smaller than the threshold value (NO in step S1904), the processing proceeds to step S1207.

FIG. 20 is a diagram illustrating an example of a screen displayed in a case where the user presses the button for the metadata key 'Total Amount' in step S1101 for the first page of the page image data. Since the metadata key 'Total Amount' is of 'Numeric Type', the CPU 211 performs steps S1102, S1201, S1202, and S1205 in this order. In the example illustrated in FIG. 20, for example, the OCR result for the block 1502 includes a character and is mis-recognized as "4875000". As a result of the determination performed for the block 1502 by the CPU 211 in step S1205, the CPU 211 determines that the OCR result does not completely match a numeric regular format. Therefore, the processing proceeds to step S1903. In step S1903, the CPU 211 calculates the matching rate between the OCR result and the numeric regular format, i.e., (number of characters determined to satisfy the numeric regular format)/(total number of characters in the OCR result)=6/7≈0.86. In step S1904, in a case where the threshold value of the matching rate is set to 0.80, the CPU 211 determines that the matching rate calculated in step S1903 is larger than or equal to the threshold value. Therefore, in step S1203, the CPU 211 displays the block 1502 as a metadata value candidate block.

According to second exemplary embodiment, even in a case where the result of the block-based OCR processing performed by the image processing server 105 includes a mis-recognized character, blocks highly likely to match the type of the metadata key selected by the user can be displayed as metadata value candidate blocks.

When the user selects a block in which the OCR result includes a mis-recognized character from the candidate blocks displayed in this way, in step S1104, the OCR result of the selected block is displayed on the metadata value input form 1005. Although the displayed OCR result includes a mis-recognized character, the user can change to appropriate metadata simply by specifying the mis-recognized character and performing a correction operation.

According to a modification of the second exemplary embodiment, the following processing is also applicable. In a case where the CPU 211 determines that the matching rate is larger than or equal to the threshold value (YES in step S1904), then in step S1203, the corresponding block is displayed as a candidate block. In a case where the user selects the candidate block (YES in step S1104), then in step S1105, the CPU 211 performs the OCR processing on the selected block again in which the OCR result is limited to the numeric value, and displays the resultant OCR result on the metadata value input form. Performing the OCR processing again by limiting the character type to the numeric value in this way increases the possibility that a correct numeric OCR result is acquired, and therefore the frequency when the user needs to perform a correction operation can be reduced. Likewise, when the user selects a candidate block determined to have a matching rate larger than or equal to the threshold value in step S1902, the OCR processing may be performed on the candidate block again by limiting the character type to the date-related character type. This increases the possibility that a correct OCR result is displayed in the metadata value input form.

A third exemplary embodiment will be described below with reference to the accompanying drawings centering on a metadata template determination method different from the above-described method. The use of the metadata template determination method according to the present exemplary embodiment makes it easier to determine a metadata template. In the descriptions of the third exemplary embodiment, configurations and processing duplicated with those according to the first and the second exemplary embodiments are assigned the same reference numerals, and detailed descriptions thereof will be omitted.

Figure 21:
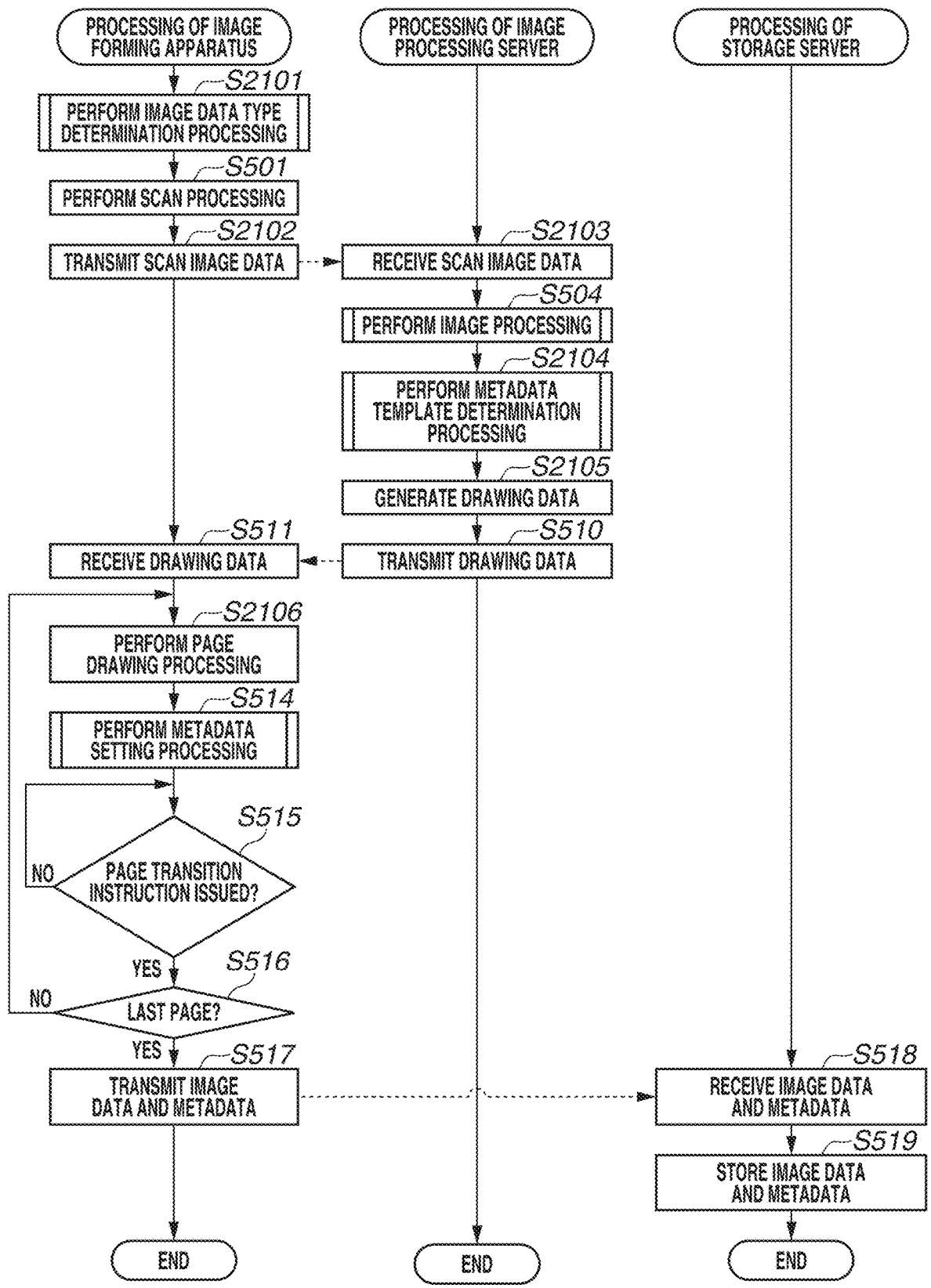
FIG. 21 is a flowchart illustrating overall processing procedure of the image processing system.

FIG. 21 is a flowchart illustrating processing of the entire system according to the present exemplary embodiment in the system configuration illustrated in FIG. 1 according to the former exemplary embodiments. Processing in steps S2101, S501, S2102, S511, S2106, and S514 to S517 is performed by the image forming apparatus 101. The program related to the processing is stored in the HDD 213, and is loaded into the RAM 212 and executed by the CPU 211. Processing in steps S2103, S504, S2104 and S2105, and S510 is performed by the image processing server 105. The program related to the processing is stored in the HDD 303, and is loaded into the RAM 302 and executed by the CPU 301. Processing in steps S518 and S519 is performed by the storage server 107. The program related to the processing is stored in the HDD 313, and is loaded into the RAM 312 and executed by the CPU 311.

In step S2101, the CPU 211 performs processing for determining the image data type. The image data type (document type) is used as information for specifying the metadata template corresponding to the document to be scanned by the image forming apparatus 101. More specifically, the CPU 211 changes the metadata template to be set according to the image data type determined in step S2101. Specific image data types and processing will be described in detail below.

Figure 22:
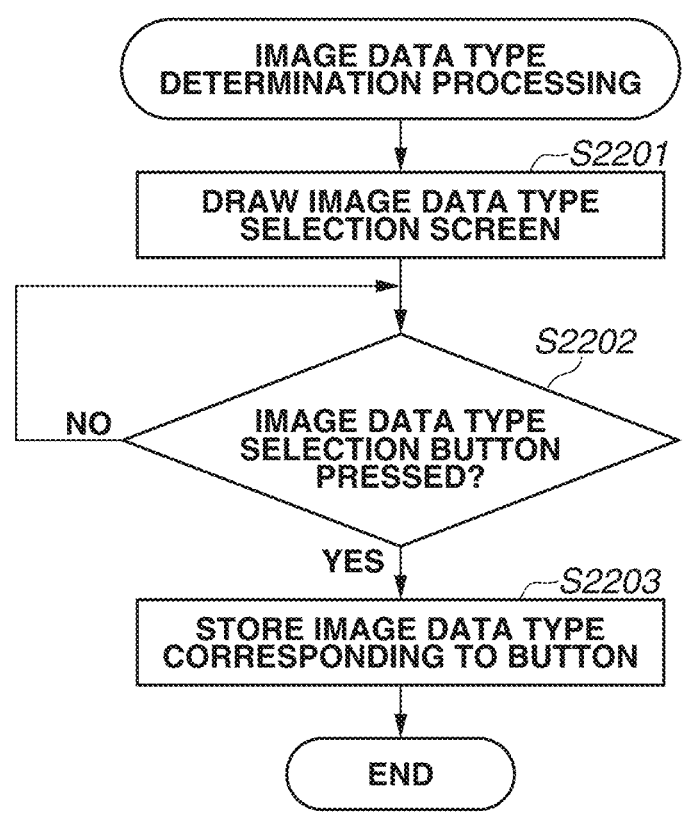
FIG. 22 is a flowchart illustrating processing procedure which is performed by the image forming apparatus.

FIG. 22 is a flowchart illustrating details of image data type determination processing in step S2101. The program related to the processing of the flowchart is stored in the HDD 213, and is loaded into the RAM 212 and executed by the CPU 211.

In step S2201, the CPU 211 draws a screen for selecting an image data type on the touch panel 401.

Figure 23:
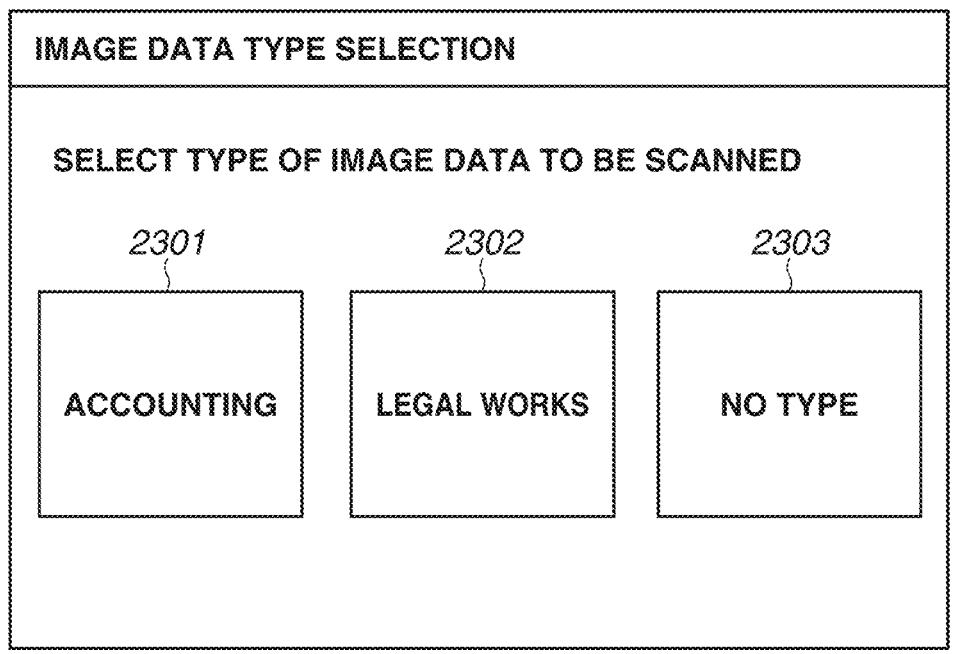
FIG. 23 is a diagram illustrating an example of a screen displayed on the operation unit of the image forming apparatus.

FIG. 23 illustrates an example of a screen drawn on the touch panel 401 in step S2201. Referring to the example illustrated FIG. 23, the touch panel 401 displays selection buttons 2301 and 2302 for specifying 'Accounting' and 'Legal Works' as image data types, respectively, and a selection button 2303 for specifying no image data type (NO TYPE).

The description of the flowchart illustrated in FIG. 22 will be resumed. In step S2202, the CPU 211 determines whether the user presses any one of the selection buttons 2301 to 2303 displayed in the image data type selection screen described above with reference to FIG. 23. In a case where the CPU 211 determines that no selection button is pressed (NO in step S2202), the CPU 211 repetitively performs the processing in step S2202 until the user presses any one selection button. Meanwhile, in a case where the CPU 211 determines that any one selection button is pressed (YES in step S2202), the processing proceeds to step S2203. In step S2203, the CPU 211 stores the image data type corresponding to the pressed button in the RAM 212 or the HDD 213. Then, the processing of the flowchart illustrated in FIG. 22 ends.

Descriptions will be given of processing in a case where the user presses the selection button 2301 for image type corresponding to 'Accounting' in step S2202.

The description of the flowchart illustrated in FIG. 21 will be resumed. In step S501, the CPU 211 performs document scan processing. In step S2102, the CPU 211 transmits the generated image data and the image data type stored in step S2203 to the image processing server 105 via the network I/F 214. In step S2103, the CPU 301 of the image processing server 105 receives the image data and the corresponding image data type from the image forming apparatus 101 via the network I/F 304. In step S504, the CPU 301 performs image processing on the received image data. In step S2104, the CPU 301 performs the metadata template determination processing based on the image data type received in step S2103.

Figure 24:
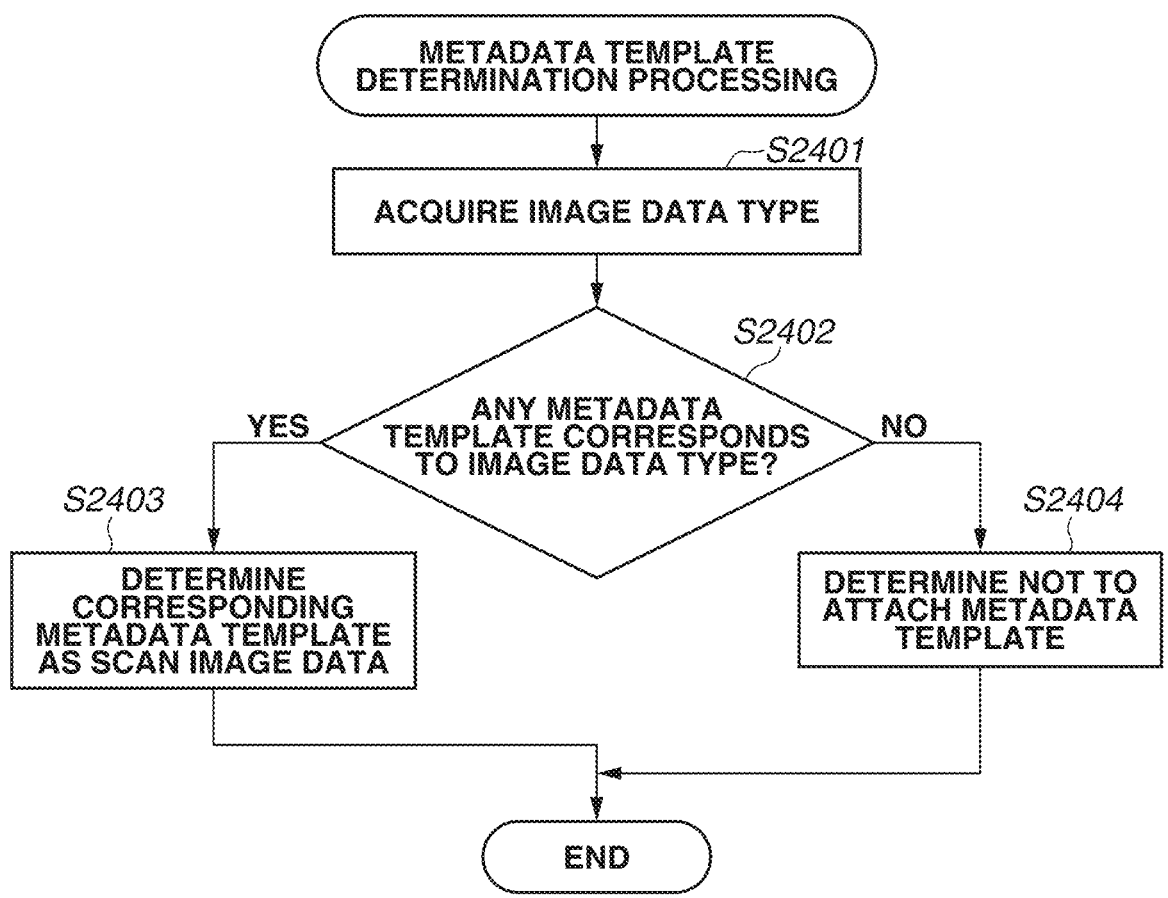
FIG. 24 is a flowchart illustrating processing procedure performed by the image processing server.

FIG. 24 is a flowchart illustrating details of the metadata template determination processing in step S2104. The program related to the processing of the flowchart is stored in the HDD 303, and is loaded into the RAM 302 and executed by the CPU 301.

In step S2401, the CPU 301 acquires the image data type received in step S2103.

In step S2402, the CPU 301 reads the metadata templates illustrated in Table 1 from the HDD 303 and determines whether the metadata template corresponding to the image data type acquired in step S2401 exists. The image processing server 105 according to the third exemplary embodiment stores beforehand combinations of the metadata templates and the metadata illustrated in Tables 1 and 2 in the HDD 303. However, the disclosure is not limited thereto. The image processing server 105 may acquire the metadata templates from the storage server 107 at this timing. In a case where the metadata template corresponding to the image data type exists (YES in step S2402), the processing proceeds to step S2403. In step S2403, the CPU 301 determines to apply the metadata template to the scan image data received in step S2103. Meanwhile, when the metadata template corresponding to the image data type does not exist (NO in step S2402), the processing proceeds to step S2404. In step S2404, the CPU 301 determines not to attach the metadata template to the scan image data received in step S2103. In a case where the image data type 'Accounting' is selected in the screen illustrated in FIG. 23, the CPU 301 determines to apply the metadata template to the scan image data since the metadata template 'Accounting' exists in Table 1. In a case where the 'No Type' button, namely, selection button 2303 is selected in the screen illustrated in FIG. 23, the result of the determination in step S2402 is "NO".

The description of the flowchart illustrated in FIG. 21 will be resumed. In step S2105, the CPU 301 generates drawing data for a screen for receiving instructions from the user when attaching metadata to the scan image data. The generated screen drawing data is the data for a screen to be displayed on the touch panel 401 of the image forming apparatus 101. According to the present exemplary embodiment, the drawing data includes page description data described in a web page description language such as Hyper Text Markup Language (HTML) and script data described in a script language such as JavaScript (registered trademark). The page description data includes as static data the image data received in step S2103, the image processing result data generated in step S504, and the metadata template determined in step S2104. The script data includes procedures for controlling screen display corresponding to the static data included in the page description data and user instructions to be input from the operation unit 204 of the image forming apparatus 101. In step S510, the CPU 301 transmits the drawing data generated in step S2105 to the image forming apparatus 101. In step S2106, the CPU 211 of the image forming apparatus 101 draws a screen on the touch panel 401 based on the static data included in the drawing data received in step S511. The screen drawn on the touch panel 401 in step S2106 is to be displayed in a state where the metadata template 'Accounting' is preselected. This screen is similar to the screen illustrated in FIG. 13A according to the first exemplary embodiment. The processing in steps S514 to S519 illustrated in FIG. 21 is similar to the processing according to the first exemplary embodiment, and redundant descriptions thereof will be omitted.

According to the third exemplary embodiment, when the user is prompted to specify an image data type (document type) before starting scanning, the metadata template corresponding to the image data type will be selected. For example, when collectively scanning documents of the same image data type, the user can set the same metadata templates at one time, making it easier to set metadata templates.

A fourth exemplary embodiment will be described below centering on a modification of the metadata setting processing in step S514 illustrated in FIG. 5, where blocks having already been selected as metadata values by the user can be displayed as such. In the descriptions of the present exemplary embodiment, configurations and processing duplicated with those according to the first exemplary embodiment are assigned the same reference numerals, and redundant descriptions thereof will be omitted.

Figure 25:
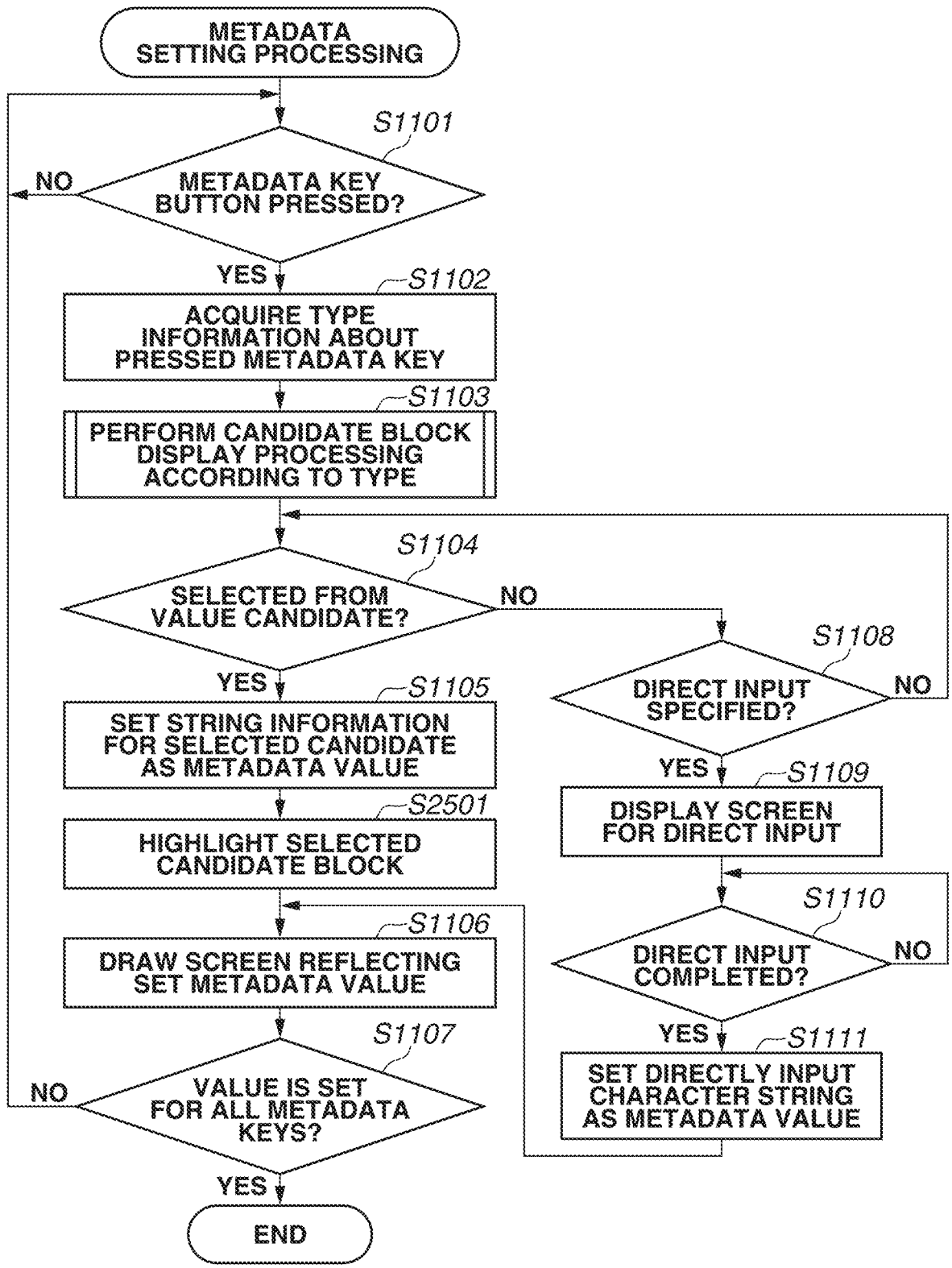
FIG. 25 is a flowchart illustrating processing procedure which is performed by the image forming apparatus.

FIG. 25 is a flowchart illustrating details of processing related to the metadata setting processing (step S514) according to the fourth exemplary embodiment. The program related to the processing of this flowchart is included in the data received in step S511, and is loaded into the RAM 212 and executed by the CPU 211.

In a case where the CPU 211 determines that the user selects a metadata key (YES in step S1101), the processing proceeds to step S1102. In step S1102, the CPU 211 acquires the type information for the selected metadata key.

Figure 26A:
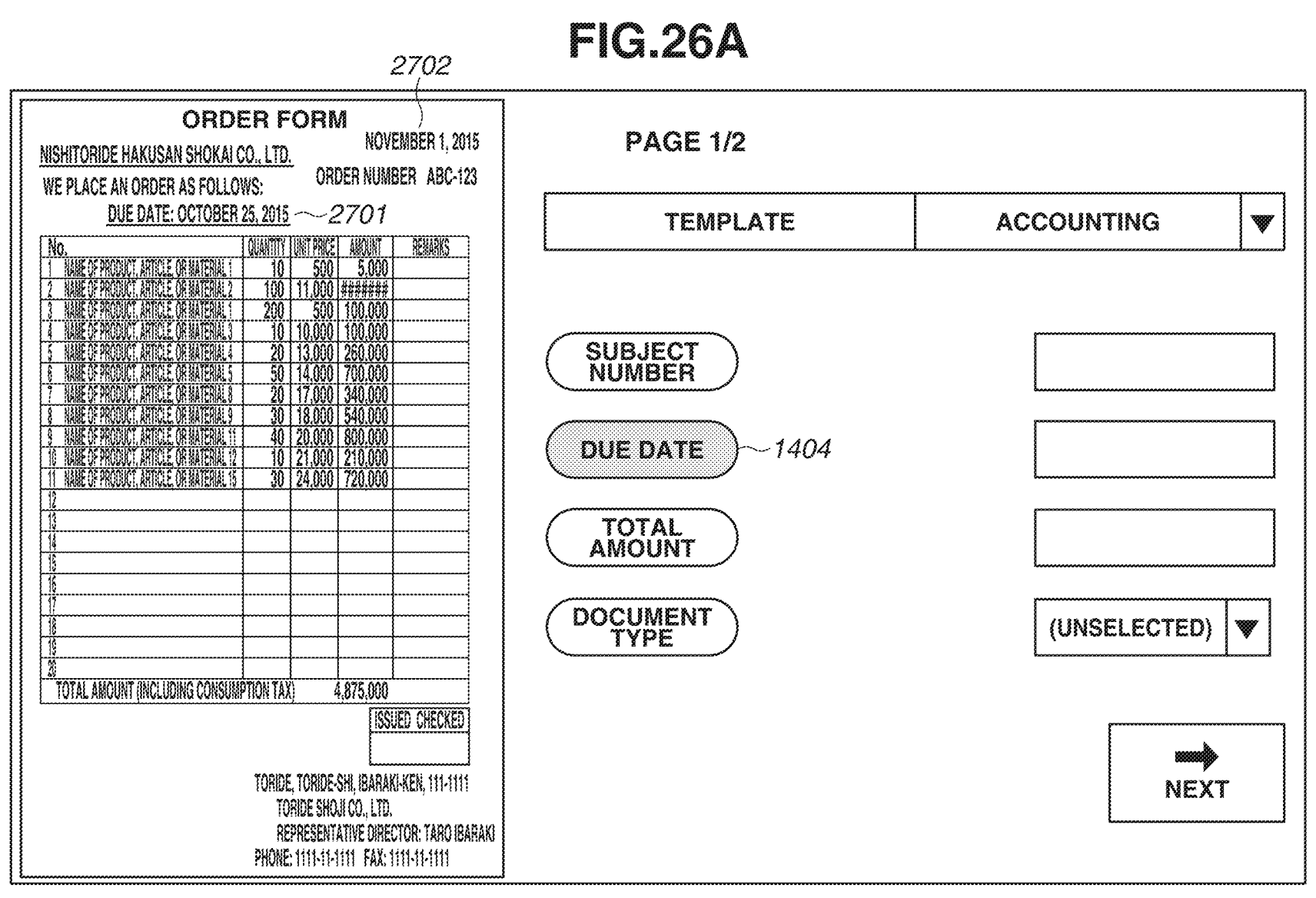

In step S1103, the CPU 211 performs candidate block determination processing corresponding to the type information acquired in step S1102. According to the first exemplary embodiment, candidate blocks have square frames as illustrated in step S1203 in FIG. 12, and FIGS. 13A, 14A, and 15A. However, according to the fourth exemplary embodiment, the display method is not limited to square frames but may be other methods allowing the user to recognize the candidate blocks. For example, square frames may be blinked, indicated using dotted lines, or displayed in different background colors. For example, in a case where the user presses the 'Due Date' key 1404 of the 'Date' type in the metadata setting screen 1001 as illustrated in FIG. 26A, date type candidate blocks 2701 and 2702 ("Oct. 25, 2015" and "Nov. 1, 2015", respectively) are blinked or enclosed in dotted lines instead of being enclosed in a simple square.

Figure 26B:
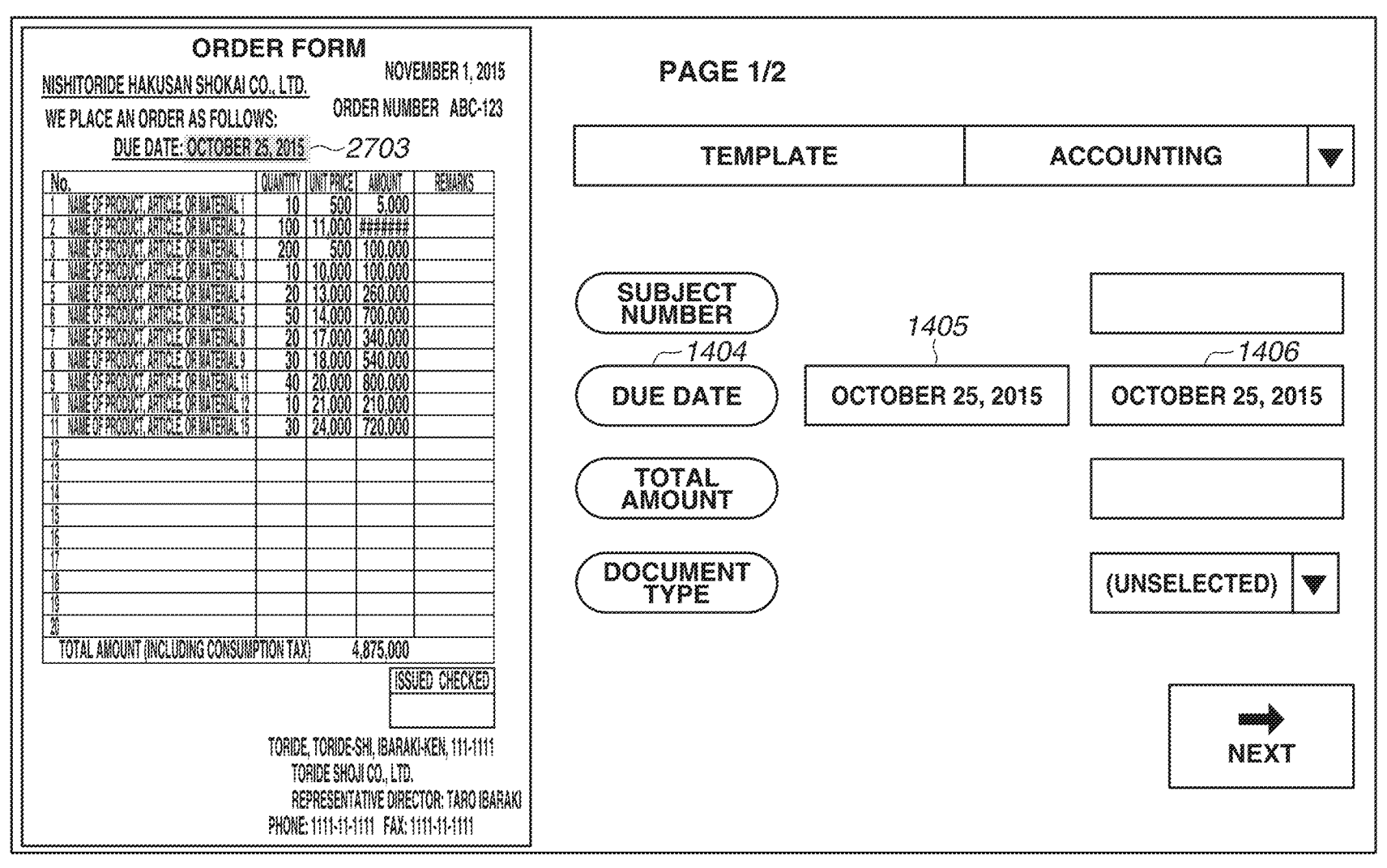

In a case where the user selects the candidate block 2701 out of value candidate blocks (YES in step S1104 illustrated in FIG. 25), the processing proceeds to step S1105. In step S1105, the CPU 211 sets the character string "Oct. 25, 2015" corresponding to the block 2701 as the metadata value corresponding to the 'Due Date' key 1404. In step S2501, the CPU 211 highlights the selected block 2701 by shading it in a predetermined semitransparent color to cause the user to recognize the block 2701 as a block having already been selected as a metadata value. This method for highlighting a selected block is different from the method for highlighting a candidate block in step S1103. For example, the background color of the candidate block displayed in step S1103 may be highlighted in a light color (e.g., light yellow), and the background color of the block having already been selected displayed in step S2501 may be highlighted in a dark color (e.g., dark blue). FIG. 26B illustrates an example of screen display in which the block selected in step S1104 is highlighted in step S2501. The block 2701 is highlighted by being shaded in a predetermined semitransparent color.

According to the fourth exemplary embodiment, blocks having already been selected as metadata key values can be displayed as such, and therefore the user's recognizability is improved.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A method comprising:
   managing a plurality of templates,
   wherein one of the plurality of templates includes a combination of a plurality of keys corresponding respectively to data formats, and
   wherein each of the plurality of templates includes a different combination of keys;
   receiving a user input when scanning a document;
   receiving, from a scanner, image data obtained by scanning the document with the scanner;
   selecting a character string from among a plurality of candidates which is obtained by a character recognition process on the image data and are determined to have a data format corresponding to one of the plurality of keys included in one template selected, according to the user input, from among the plurality of templates;
   displaying, on a screen, the selected character string obtained by the character recognition process and an image extracted from the image data corresponding to the character string in addition to the image data; and
   setting, to the image data, a character string displayed on the screen.

2. The method according to claim 1, further comprising:
   displaying, on the displayed image data, in such a manner that a plurality of character string areas is recognizable by a user as a candidates, a plurality of character string areas including the plurality of candidates which is a plurality of character strings in a data format corresponding to the one of the plurality of keys, the plurality of character strings being obtained by the character recognition process on the image data obtained by scanning the document,
   wherein the selected character string is selected by the user and is included in a character area displayed in the manner that the character area is recognizable is set to the image data.

3. The method according to claim 2, wherein the plurality of character string areas is displayed recognizable as the candidates by displaying frames at positions corresponding to the plurality of character string areas.

4. The method according to claim 2, wherein the plurality of character string areas is displayed recognizable as the candidates by highlighting the character string areas.

5. The method according to claim 2, further comprising:
   displaying the plurality of keys included in the one template selected, according to the user input, from among the plurality of templates,
   wherein the plurality of character string areas including the plurality of candidates which is a plurality of character strings in a data format corresponding to the one of the plurality of keys selected by the user from the plurality of keys is displayed on the displayed image data in such a manner that the plurality of character string areas is recognizable by the user as a candidates, the character string being obtained by the character recognition process on the image data obtained by scanning the document.

6. The method according to claim 2, wherein the selected a character string area including the selected character string is displayed recognizable as a character string area having already been selected on the image.

7. The method according to claim 1,
   wherein the plurality of keys included in the one template selected according to the user input from among the plurality of templates, and value input fields corresponding to the plurality of keys are displayed, and
   wherein the selected character string is input to a value input field corresponding to the one of the plurality of keys.

8. The method according to claim 7,
   wherein the value input fields are displayed corresponding to each of the plurality of keys.

9. The method according to claim 1,
   wherein the data format is a text type indicating an arbitrary character string, a date type indicating a character string having a date format, or a numeric type indicating a character string including a number or an amount of money.

10. The method according to claim 1,
wherein, in a case where a data format corresponding to the one of the plurality of keys included in the one template is of a selection type indicating that data is to be selected from predetermined options, a character string selected by a user from the predetermined options is set to the image data.

11. The method according to claim 1, further comprising acquiring, from an external apparatus, the plurality of templates.

12. The method according to claim 1, wherein, in a case where a matching rate between the character string being obtained by the character recognition process on the image data obtained by scanning the document and the data format corresponding to the one of the plurality of keys included in the one template is equal to or larger than a threshold value, the character string obtained by the character recognition process is set to the image data.

13. The method according to claim 1, further comprising:
receiving another user input on the screen, and
displaying, on the screen, a character string selected from among a plurality of candidates which is a plurality of character strings obtained by the character recognition process on the image data and whose data format corresponds to one of a plurality of keys included in another template selected, according to said another user input on the screen, from among the plurality of templates.

14. The method according to claim 1, further comprising displaying a screen of a template from the plurality of templates to be used for the scanned document, the screen including a plurality of display portions.

15. A non-transitory computer-readable storage medium storing a program for causing a processor to perform:
managing a plurality of templates,
wherein one of the plurality of templates includes a combination of a plurality of keys corresponding respectively to data formats, and
wherein each of the plurality of templates includes a different combination of keys;
receiving a user input when scanning a document;
receiving, from a scanner, image data obtained by scanning the document with the scanner;
selecting a character string from among a plurality of candidates which is obtained by a character recognition process on the image data and are determined to have a data format corresponding to one of the plurality of keys included in one template selected, according to the user input, from among the plurality of templates;
displaying, on a screen, the selected character string obtained by the character recognition process and an image extracted from the image data corresponding to the character string in addition to the image data; and
setting, to the image data, a character string displayed on the screen.

16. The non-transitory computer-readable storage medium according to claim 15, further comprising:
receiving another user input on the screen, and
displaying, on the screen, a character string selected from among a plurality of candidates which is a plurality of character strings obtained by the character recognition process on the image data and whose data format corresponds to one of a plurality keys included in another template selected, according to said another user input on the screen, from among the plurality of templates.

17. The apparatus according to claim 16, further performing:
receiving another user input on the screen, and
displaying, on the screen, a character string selected from among a plurality of candidates which is a plurality of character strings obtained by the character recognition process on the image data and whose data format corresponds to one of a plurality of keys included in another template selected, according to said another user input on the screen, from among the plurality of templates.

18. An apparatus for controlling display of a screen, the apparatus performing:
managing a plurality of templates,
wherein one of the plurality of templates includes a combination of a plurality of keys corresponding respectively to data formats, and
wherein each of the plurality of templates includes a different combination of keys;
receiving a user input when scanning a document;
receiving, from a scanner, image data obtained by scanning the document with the scanner;
selecting a character string from among a plurality of candidates which is obtained by a character recognition process on the image data and are determined to have a data format corresponding to one of the plurality of keys included in one template selected, according to the user input, from among the plurality of templates;
displaying, on a screen, the selected character string obtained by the character recognition process and an image extracted from the image data corresponding to the character string in addition to the image data; and
setting, to the image data, a character string displayed on the screen.

* * * * *